US012576392B2

(12) United States Patent
Schwab et al.

(10) Patent No.: US 12,576,392 B2
(45) Date of Patent: Mar. 17, 2026

(54) MOLDING COMPRISING A MIXED OXIDE COMPRISING OXYGEN, LANTHANUM, ALUMINUM, AND COBALT

(71) Applicant: BASF SE, Ludwigshafen am Rhein (DE)

(72) Inventors: Ekkehard Schwab, Neustadt (DE); Marcelo Daniel Kaufman Rechulski, Ludwigshafen am Rhein (DE); Stefan Dietrich, Heidelberg (DE); Sandra Magnus, Ludwigshafen am Rhein (DE); Sabine Borchers, Ludwigshafen am Rhein (DE); Stephan A. Schunk, Heidelberg (DE); Christiane Kuretschka, Ludwigshafen am Rhein (DE); Marie Katrin Schroeter, Ludwigshafen am Rhein (DE); Xue Liu, Beachwood, OH (US); Thorsten Johann, Ludwigshafen am Rhein (DE)

(73) Assignee: BASF SE, Ludwigshafen Am Rhein (DE)

( * ) Notice: Subject to any disclaimer, the term of this patent is extended or adjusted under 35 U.S.C. 154(b) by 825 days.

(21) Appl. No.: 17/427,332

(22) PCT Filed: Jan. 30, 2020

(86) PCT No.: PCT/EP2020/052296
§ 371 (c)(1),
(2) Date: Jul. 30, 2021

(87) PCT Pub. No.: WO2020/157202
PCT Pub. Date: Aug. 6, 2020

(65) Prior Publication Data
US 2022/0134312 A1 May 5, 2022

(30) Foreign Application Priority Data
Jan. 31, 2019 (EP) ..................................... 19154736

(51) Int. Cl.
*B01J 23/00* (2006.01)
*B01J 21/04* (2006.01)
(Continued)

(52) U.S. Cl.
CPC ............. *B01J 23/002* (2013.01); *B01J 21/04* (2013.01); *B01J 23/83* (2013.01); *B01J 35/37* (2024.01);
(Continued)

(58) Field of Classification Search
CPC ........ B01J 35/737; B01J 35/612; B01J 21/04; B01J 23/002; C01B 2203/1052
See application file for complete search history.

(56) References Cited

U.S. PATENT DOCUMENTS 9,259,712 B2 2/2016 Schwab et al.
2004/0063989 A1 4/2004 Hechler et al.
(Continued)

FOREIGN PATENT DOCUMENTS

CA 2864063 A1 8/2013
CN 104080530 A 10/2014
(Continued)

OTHER PUBLICATIONS

International Preliminary Report on Patentability received for PCT Patent Application No. PCT/EP2020/052296, mailed on Aug. 12, 2021, 19 pages.
(Continued)

*Primary Examiner* — Anthony J Zimmer
*Assistant Examiner* — Eric Scott Sherman
(74) *Attorney, Agent, or Firm* — Faegre Drinker Biddle & Reath LLP

(57) ABSTRACT

A molding comprising a mixed oxide, wherein the mixed oxide comprises oxygen, lanthanum, aluminum, and cobalt, wherein in the mixed oxide, the weight ratio of cobalt
(Continued)

relative to aluminum, calculated as elements, is at least 0.17:1. A preparation method by a dry route. Use of the molding as a catalyst for the reforming of hydrocarbons into a synthesis gas.

11 Claims, 5 Drawing Sheets

(51) Int. Cl.

| | |
|---|---|
| *B01J 23/83* | (2006.01) |
| *B01J 35/37* | (2024.01) |
| *B01J 35/61* | (2024.01) |
| *B01J 35/70* | (2024.01) |
| *B01J 37/00* | (2006.01) |
| *C01B 3/40* | (2006.01) |

(52) U.S. Cl.
CPC ............. *B01J 35/612* (2024.01); *B01J 35/70* (2024.01); *B01J 37/0018* (2013.01); *C01B 3/40* (2013.01); *B01J 2235/00* (2024.01); *B01J 2235/15* (2024.01); *C01B 2203/0238*

(2013.01); *C01B 2203/1052* (2013.01); *C01B 2203/1241* (2013.01); *C01B 2203/1247* (2013.01)

(56) References Cited

U.S. PATENT DOCUMENTS

| | | | |
|---|---|---|---|
| 2008/0183024 | A1 | 7/2008 | Klanner et al. |
| 2017/0354956 | A1* | 12/2017 | Koenig .................... C01B 3/40 |

FOREIGN PATENT DOCUMENTS

| | | | |
|---|---|---|---|
| JP | 02-074505 | A | 3/1990 |
| JP | 2015-006961 | A | 1/2015 |
| JP | 2015-511209 | A | 4/2015 |
| JP | 2017-533169 | A | 11/2017 |
| WO | 2013/118078 | A1 | 8/2013 |

OTHER PUBLICATIONS

International Search Report and Written Opinion received for PCT Patent Application No. PCT/EP2020/052296, mailed on Apr. 15, 2020, 22 pages.

* cited by examiner

TOS [h]

△ X(CO2)_rel    ▣ X(CH4)_rel    — Temperature of the reactor wall
--- GasFeed H2O    --- GasFeed CH4    --- GasFeed CO2
--- GasFeed H2    — GHSV    --- GHSV (Vol. corr.)

MOLDING COMPRISING A MIXED OXIDE COMPRISING OXYGEN, LANTHANUM, ALUMINUM, AND COBALT

CROSS-REFERENCE TO RELATED APPLICATIONS

This application is a national stage application (under 35 U.S.C. § 371) of PCT/EP2020/052296, filed Jan. 30, 2020, which claims benefit of European Application No. 19154736.3, filed Jan. 31, 2019, both of which are incorporated herein by reference in their entirety.

The present invention relates to a molding comprising a mixed oxide, wherein the mixed oxide comprises oxygen, lanthanum, aluminum, and cobalt, the process for preparation thereof and its use, in particular in the synthesis procedure for the conversion of a hydrocarbon to a synthesis gas in the presence of steam and carbon dioxide.

Reforming of hydrocarbons to a synthesis gas is a known catalytic reaction, in which Ni- or Co-containing oxide-based catalysts are used. In general, cost-effective solutions have great economic potential due to the pressure on cost minimization. Thus, the production costs for reforming of hydrocarbons to a synthesis gas, which particularly comprises hydrogen and carbon monoxide, may be reduced by using a more active and selective mixed oxide as heterogeneous oxidic reforming catalyst, but also by increasing the stability of the catalyst and by improving the cost of the catalyst production.

WO 2013/118078 A1 discloses a hexaaluminate-containing catalyst for reforming of a hydrocarbon as well as a process for reforming. As regards the catalyst, it is disclosed that it further comprises, besides aluminum and cobalt, at least one element from the group consisting of Ba, Sr, and La. Further, a molar ratio of cobalt to aluminum in the catalyst is disclosed as being in the range of from 0.03 to 0.17. According to the examples, it is particularly preferred to prepare a catalyst from the nitrates of cobalt and lanthanum.

U.S. Pat. No. 9,259,712 B2 relates to a process for producing a reforming catalyst and the reforming of methane. The catalyst comprises a nickel-magnesium mixed oxide and optionally aluminum oxide hydroxide. The preparation of the catalyst is preferably achieved using nickel nitrate as starting material. Also, additional metals may be included in the preparation, disclosed are inter alia aluminum, lanthanum, and cobalt.

The process for preparation of a mixed oxide serving as a catalytically active species for above mentioned reforming reaction is currently either done by precipitation, e.g. from an aqueous solution, or by mixing of the starting materials as solids, i.e. the solid mixing route. Both state-of-the-art routes involve the use of the corresponding water-soluble metal salts as starting materials. Usually the nitrates of cobalt and/or nickel are used. The mixed oxide may then be used to form a molding. Alternatively, a molding may be prepared comprising a suitable support material which is then impregnated with an aqueous solution comprising cobalt and/or nickel. As a source for cobalt and/or nickel any water soluble salt thereof may be used. The impregnation itself can be achieved by common methods.

These routes have the drawback that significant amounts of nitrate-containing waste are produced. This waste has to be neutralized to avoid emissions of nitrate-containing water or NOx in the environment. For instance, the use of metal nitrates in the solid mixing route results in the formation of high amounts of NOx in the off-gas which is formed during the thermal oxidative treatment of the catalyst precursor. Thus, the latter off-gas has to be cleaned with high efforts to avoid emission of NOx into the environment.

As an alternative, a nitrate-free catalyst production route in particular to a more active and selective mixed oxide as heterogeneous oxidic reforming catalysts would improve the economics of reforming of hydrocarbons to synthesis gas significantly. Hence, it was an object of the present invention to develop such a process for preparation of a mixed oxide useful in a molding for reforming of hydrocarbons to a synthesis gas. It was a further object of the present invention to provide a novel molding comprising a mixed oxide comprising oxygen, lanthanum, aluminum, and cobalt exhibiting improved properties in particular as a catalytically active material, as a catalyst component or as a catalyst, e.g. for a reforming reaction as disclosed above.

Surprisingly, it was found that an improved process for preparing a molding comprising a mixed oxide can be achieved if water-insoluble nitrate-free metal salts, preferably in combination with an alumina source, are used as starting materials in combination with an aqueous acid as starting materials, in particular using the solid mixing route. The use of carbonates as water-insoluble nitrate-free metal salts is particularly preferred.

In particular in the case where carbonates are used as water-insoluble nitrate-free metal salts, a low amount of acid may be used when an appropriate amount of liquid is used together with the acid.

A further advantage of the inventive preparation process of a molding is achieved by the specific combination of calcination and densification step which is preferably performed by tableting. It has surprisingly been found that tableting requires comparatively less power and that still harder tablets can be gained.

Further, it was surprisingly found that the inventive molding comprising a mixed oxide has improved properties in particular as a catalytically active material, as a catalyst component or as a catalyst for the preparation of a synthesis gas comprising carbon monoxide and hydrogen. In particular, it has been found that the inventive molding comprising a mixed oxide shows improved long term stability in particular since it shows a low coke formation during its use as a catalyst or catalyst component for the preparation of a synthesis gas.

Therefore, the present invention relates to a molding comprising a mixed oxide, wherein the mixed oxide comprises oxygen, lanthanum, aluminum, and cobalt, wherein in the mixed oxide, the weight ratio of cobalt relative to aluminum, calculated as elements, is at least 0.17:1.

According to the present invention, a molding is to be understood as a three-dimensional entity obtained from a shaping process; accordingly, the term "molding" is used synonymously with the term "shaped body".

Further, the present invention relates to a process for preparing a molding comprising the mixed oxide as disclosed herein, preferably the molding as disclosed above, the process comprising (i) preparing a mixture comprising a lanthanum salt, a cobalt salt, an oxidic aluminum compound, and an acid, wherein one or more of the lanthanum salt and the cobalt salt, preferably both the lanthanum salt and the cobalt salt are not a nitrate;

(ii) preparing a molding from the mixture obtained from (i), comprising (ii.1) subjecting the mixture obtained from (i) to a shaping process, obtaining a first molding;

(ii.2) preferably drying the first molding obtained from (ii.1) in a gas atmosphere;

(ii.3) calcining the first molding obtained from (ii.1) or (ii.2), preferably from (ii.2), in a gas atmosphere having a temperature in the range of from 350 to 470° C.;

(iii) preferably subjecting the calcined first molding obtained from (ii) to a re-shaping process, obtaining a second molding having a geometry different from the geometry of the first molding;

(iv) calcining the molding obtained from (ii) or (iii), preferably from (iii), in a gas atmosphere having a temperature in the range of from 1100 to 1400° C., obtaining the molding comprising the mixed oxide.

Yet further, the present invention relates to a molding, preferably the molding described above, obtainable or obtained by the process described above.

Yet further, the present invention relates to the use said molding as a catalytically active material, as a catalyst component or as a catalyst, preferably for reforming one or more hydrocarbons.

As regards the mixed oxide comprised in the molding, it is preferred that the weight ratio of cobalt relative to aluminum, calculated as elements, in the mixed oxide is in the range of from 0.17:1 to 0.24:1, more preferably in the range of from 0.18:1 to 0.23:1, more preferably in the range of from 0.19:1 to 0.22:1. Further, it is preferred that the weight ratio of cobalt relative to lanthanum, calculated as elements, in the mixed oxide is in the range of from 0.35:1 to 0.48:1, more preferably in the range of from 0.38:1 to 0.45:1, more preferably in the range of from 0.40:1 to 0.43:1.

It is preferred that the mixed oxide comprised in the mixed oxide substantially consists of oxygen, lanthanum, aluminum, cobalt, and optionally hydrogen. It is particularly preferred that from 99 to 100 weight-%, more preferably from 99.5 to 100 weight-%, more preferably from 99.9 to 100 weight-% of the mixed oxide consist of oxygen, lanthanum, aluminum, cobalt, and optionally hydrogen.

As regards the contents of cobalt, lanthanum and aluminum in the mixed oxide comprised in the molding, no particular restriction applies. It is preferred that from 6 to 9 weight-%, more preferably from 6.5 to 8.5 weight-%, more preferably from 7 to 8 weight-% of the mixed oxide consist of cobalt, calculated as element. Further, it is preferred that from 15 to 20 weight-%, more preferably from 16 to 19 weight-%, more preferably from 17 to 18 weight-%, more preferably from 17.5 to 17.8 weight-% of the mixed oxide consist of lanthanum, calculated as element. Further, it is preferred that from 33 to 40 weight-%, more preferably from 34 to 38 weight-%, more preferably from 35 to 37 weight-%, more preferably from 35.5 to 36.5 weight-% of the mixed oxide consist of aluminum calculated as element.

The mixed oxide may comprise an amorphous phase, one or more crystalline phases, or an amorphous phase and one or more crystalline phases. According to the present invention, the mixed oxide exhibits specific properties that can be determined via X-ray diffraction, in particular as described in Reference Example 3. It is preferred that the mixed oxide comprises one or more crystalline phases, more preferably at least two crystalline phases, more preferably at least three crystalline phases. It is preferred that from 80 to 100 weight-% of the mixed oxide is in crystalline form, more preferably from 90 to 100 weight-%, more preferably from 92 to 100 weight-%.

Further, it is preferred that the mixed oxide comprises one or more of a crystalline phase of $LaCoAl_{11}O_{19}$ and a crystalline phase of $LaAl(Co)O_3$. In the case where the mixed oxide comprises a crystalline phase of $LaCoAl_{11}O_{19}$ and a crystalline phase of $LaAl(Co)O_3$, it is preferred that the weight ratio of $LaCoAl_{11}O_{19}$ relative to $LaAl(Co)O_3$ is in the range of from 5:1 to 30:1, more preferably in the range of from 10:1 to 25:1, more preferably in the range of from 12:1 to 22:1, more preferably in the range of from 13:1 to 20:1, more preferably in the range of from 13:1 to 15:1, determined via XRD as described in Reference Example 3. It is particularly preferred that the mixed oxide comprises a further crystalline phase $La(OH)_3$. Further, it is particularly preferred that the mixed oxide comprises a further crystalline phase $LaAlO_3$.

Further, it is preferred that the mixed oxide comprises a further crystalline phase $CoAl_2O_4$. In the case where the mixed oxide comprises at least a crystalline phase of $LaCoAl_{11}O_{19}$ and a crystalline phase $CoAl_2O_4$, it is preferred that the weight ratio of $LaCoAl_{11}O_{19}$ relative to $CoAl_2O_4$ in the mixed oxide is in the range of from 8:1 to 35:1, more preferably in the range of from 10:1 to 30:1, more preferably in the range of from 12:1 to 30:1, more preferably in the range of from 15:1 to 27:1, more preferably in the range of from 17:1 to 25:1, more preferably in the range of from 20:1 to 22:1, determined via XRD as described in Reference Example 3.

According to the present invention, the molding which is not calcined exhibits specific properties which can be determined via UV/Vis spectroscopy, in particular as described in Reference Example 4. It is preferred that the molding, wherein the molding is not calcined, exhibits a peak having a minimum in the range of from 2300 to 2400 nm in a UV/Vis spectrum, determined as described in Reference Example 4.

Preferably, the molding comprising a mixed oxide is substantially free of sulfur. Preferably, the molding comprises sulfur, calculated as elemental S, in the range of from 0 to 10 mg per kg of the molding, more preferably in the range of from 0 to 5 mg per kg, more preferably in the range of from 0 to 3 mg per kg, more preferably in the range of from 0 to 2.5 mg per kg, more preferably in the range of from 2 mg per kg.

It is preferred that at least 50 weight-%, preferably from 50 to 100 weight-%, more preferably from 60 to 100 weight-%, more preferably from 70 to 100 weight-%, more preferably from 80 to 100 weight-%, more preferably from 90 to 100 weight-%, more preferably from 95 to 100 weight-%, more preferably from 99 to 100 weight-% of the molding consist of the mixed oxide and optionally at least one suitable binder. More preferably from 99 to 100 weight-%, more preferably from 99.5 to 100 weight-%, more preferably from 99.9 to 100 weight-% of the molding consist of the mixed oxide.

Generally, the shape of the molding and the shaping process according to which the molding is prepared is not subject to any specific restrictions and can be adapted to the specific needs based on the intended use of the molding. Preferably, the molding is prepared by a tableting method. Therefore, the molding is preferably a tablet.

Preferably, the cross-section of the molding comprises one, two, three, four or more holes. More preferably, the molding has a four-hole cross-section, especially in the case where the molding is a tablet. It is particularly preferred that the molding is a tablet having a four-hole cross-section and having one or more four flutes, such as one, two, three of four flutes. More preferably, the molding is a tablet having a four-hole cross-section and having four flutes.

According to a first specific alternative, the molding is a tablet having a four-hole cross-section and having four flutes, wherein the molding has a diameter in the range of from 15 to 19 mm, preferably in the range of from 16 to 18 mm, more preferably in the range of from 16.7 to 16.8 mm, and a height in the range of from 9 to 11 mm, preferably in the range of from 9.5 to 10.5 mm, more preferably in the range of from 9.7 to 10.0 mm.

It is preferred that the molding of the first alternative is a calcined molding. It is more preferred that the molding is a calcined molding, wherein the calcination has been performed in a gas atmosphere having a temperature in the range of from 350 to 450° C., preferably in the range of from 360 to 440° C., more preferably in the range of from 375 to 425° C., more preferably in the range of from 390 to 410° C. Further, it is preferred that the gas atmosphere comprises oxygen, more preferably is one or more of oxygen, air, or lean air. Preferably, the calcining was performed for 0.5 to 20 h, more preferably for 1 to 15 h, more preferably for 2 to 10 h, more preferably for 3 to 5 h.

According to the first alternative, the molding exhibits specific properties, in particular a specific crushing strength. In particular, the crushing strength can be determined as described in Reference Example 5 for each pair of opposite sides of the table. It is preferred that the molding has a side crushing strength 1 (SCS1) of at least 70 N, more preferably in the range of from 70 to 250 N, more preferably in the range of from 70 to 130 N, determined as described in Reference Example 5. Preferably, the molding is a tablet having a four-hole cross-section and having four flutes, wherein four cylindrical segments are located in an area between two flutes, wherein the side crushing strength 1 is measured according to Reference Example 5 in a condition where the molding stands on two cylindrical segments sided by a flute. Preferably, the molding has a side crushing strength 2 (SCS2) of at least 60 N, more preferably in the range of from 60 to 200 N, more preferably in the range of from 60 to 88 N, determined as described in Reference Example 5. More preferably, the molding is a tablet having a four-hole cross-section and having four flutes, wherein four cylindrical segments are located in an area each between two flutes, wherein the side crushing strength 2 (SCS2) is measured according to Reference Example 5 in a condition where the molding stands on a cylindrical segment. Preferably, the molding has a side crushing strength 3 (SCS3) of at least 190 N, more preferably in the range of from 190 to 350 N, more preferably in the range of from 190 to 240 N, determined as described in Reference Example 5. More preferably, the molding is a tablet having a four-hole cross-section and having four flutes, wherein four cylindrical segments are located in an area between two flutes, wherein the side crushing strength 3 (SCS3) is measured according to Reference Example 5 in a condition where the area of the cylindrical segments is perpendicular to the direction of the force applied on the molding.

According to a second specific alternative, the molding is a tablet having four flutes and having a four-hole cross-section, wherein the molding has a diameter in the range of from 13 to 18 mm, preferably in the range of from 14.5 to 16.0 mm, more preferably in the range of from 15.0 to 15.5 mm, and a height in the range of from 7 to 11 mm, preferably in the range of from 8.2 to 9.4 mm, more preferably in the range of from 8.6 to 9.0 mm.

It is preferred that the molding of the second alternative is a calcined molding. It is more preferred that the molding is a calcined molding, wherein the calcination has been performed in a gas atmosphere having a temperature in the range of from 1100 to 1400° C., more preferably in the range of from 1125 to 1275° C., more preferably in the range of from 1150 to 1250° C., more preferably in the range of from 1175 to 1225° C., wherein the gas atmosphere preferably comprises oxygen, more preferably is one or more of oxygen, air, or lean air. Preferably, the calcining was performed for 0.5 to 20 h, more preferably for 1 to 15 h, more preferably for 2 to 10 h, more preferably for 3 to 5 h.

According to the second alternative, the molding exhibits specific properties, in particular a specific crushing strength. Preferably, the crushing strength can be determined as described in Reference Example 1 for each pair of opposite sides. It is preferred that the molding has a side crushing strength 1 (SCS1) of at least 366 N, preferably of at least 400 N, more preferably in the range of from 400 to 800 N, more preferably in the range of from 400 to 600 N, more preferably in the range of from 400 to 570 N, determined as described in Reference Example 1. More preferably, the molding is a tablet having a four-hole cross-section and having four flutes, wherein four cylindrical segments are located in an area between two flutes, wherein the side crushing strength 1 is measured according to Reference Example 1 in a condition where the molding stands on two cylindrical segments sided by a flute. Preferably, the molding has a side crushing strength 2 (SCS2) of at least 170 N, more preferably of at least 190 N, more preferably in the range of from 190 to 450 N, more preferably in the range of from 190 to 300 N, more preferably in the range of from 190 to 270 N, determined as described in Reference Example 1. More preferably, the molding is a tablet having a four-hole cross-section and having four flutes, wherein four cylindrical segments are located in an area each between two flutes, wherein the side crushing strength 2 is measured according to Reference Example 1 in a condition where the molding stands on a cylindrical segment. Further, it is preferred that the molding has a side crushing strength 3 (SCS3) of at least 345 N, more preferably of at least 500 N, more preferably in the range of from 500 to 950 N, more preferably in the range of from 500 to 800 N, more preferably in the range of from 500 to 770 N, determined as described in Reference Example 1. More preferably, the molding is a tablet having a four-hole cross-section and having four flutes, wherein four cylindrical segments are located in an area each between two flutes, wherein the side crushing strength 3 is measured according to Reference Example 1 in a condition where the area of the cylindrical segments is perpendicular to the direction of the force applied on the molding.

Further, as regards the molding of the present invention, it is preferred that the molding has a BET specific surface area in the range of from 1 to 10 m$^2$/g, more preferably in the range of from 5 to 10 m$^2$/g, more preferably in the range of from 7 to 10 m$^2$/g, more preferably in the range of from 7.5 to 9.6 m$^2$/g, determined according to Reference Example 2.

Further, it is preferred that the molding has a Langmuir specific surface area in the range of from 1 to 15 m$^2$/g, more preferably in the range of from 5 to 15 m$^2$/g, more preferably in the range of from 10 to 15 m$^2$/g, more preferably in the range of from 11.0 to 13.5 m$^2$/g, more preferably in the range of from 11.2 to 13.3 m$^2$/g, determined as described in Reference Example 2.

Furthermore, the present invention relates to a process for preparing the molding comprising a mixed oxide as disclosed herein, the process comprising (i) preparing a mixture comprising a lanthanum salt, a cobalt salt, an oxidic aluminum compound, and an acid, wherein one or more of the lanthanum salt and the cobalt salt, preferably both the lanthanum salt and the cobalt salt are not a nitrate;

(ii) preparing a molding from the mixture obtained from (i), comprising (ii.1) subjecting the mixture obtained from (i) to a shaping process, obtaining a first molding;

(ii.2) preferably drying the first molding obtained from (ii.1) in a gas atmosphere;

(ii.3) calcining the first molding obtained from (ii.1) or (ii.2), preferably from (ii.2), in a gas atmosphere having a temperature in the range of from 350 to 470° C.;

(iii) preferably subjecting the calcined first molding obtained from (ii) to a re-shaping process, obtaining a second molding having a geometry different from the geometry of the first molding;

(iv) calcining the molding obtained from (ii) or (iii), preferably from (iii), in a gas atmosphere having a temperature in the range of from 1100 to 1400° C., obtaining the molding comprising the mixed oxide.

It is preferred that the lanthanum salt comprises, more preferably is, one or more of a lanthanum carbonate, a lanthanum oxalate, a lanthanum acetate, a lanthanum tartrate, a lanthanum formate, a lanthanum sulfate, a lanthanum sulfide, a lanthanum fluoride, a lanthanum chloride, a lanthanum bromide, and a lanthanum iodide, more preferably a lanthanum carbonate, wherein the lanthanum carbonate more preferably comprises, more preferably is $La_2(CO_3)_3 \cdot xH_2O$, wherein $0 \leq x \leq 10$, preferably $0 \leq x \leq 6$.

It is preferred that the cobalt salt comprises, more preferably is, one or more of a cobalt carbonate, a cobalt oxalate, a cobalt acetate, a cobalt tartrate, a cobalt formate, a cobalt sulfate, a cobalt sulfide, a cobalt fluoride, a cobalt chloride, a cobalt bromide, and a cobalt iodide, more preferably a cobalt carbonate, more preferably a cobalt carbonate, wherein the cobalt carbonate more preferably comprises, more preferably is $CoCO_3 \cdot yH_2O$, wherein $0 \leq y \leq 7$, preferably $0 \leq y \leq 6$.

It is preferred that the oxidic aluminum compound comprises, more preferably is, one or more of AlOOH (boehmite), $Al_2O_3$, and $Al(OH)_3$, wherein more preferably, the oxidic aluminum compound comprises, more preferably is AlOOH. Further, it is preferred that the oxidic aluminum compound has a BET specific surface area in the range of from 150 to 220 m²/g, more preferably in the range of from 170 to 200 m²/g, more preferably in the range of from 180 to 190 m²/g, determined according to Reference Example 2. Further, it is preferred that the oxidic aluminum compound has a bulk density in the range of from 0.40 to 0.60 g/ml, more preferably in the range of from 0.45 to 0.53 g/ml, more preferably in the range of from 0.47 to 0.51 g/ml.

In the mixture prepared in (i), it is preferred that the weight ratio of lanthanum, calculated as element, relative to aluminum, calculated as element, La:Al, is in the range of from 0.37:1 to 1:1, more preferably in the range of from 0.5:1 to 1:1, more preferably in the range of from 0.6:1 to 0.9:1, more preferably in the range of from 0.65:1 to 0.8:1, more preferably in the range of from 0.70:1 to 0.75:1.

In the mixture prepared in (i), it is preferred that the weight ratio of lanthanum, calculated as element, relative to cobalt, calculated as element, La:Co, is in the range of from 1.5:1 to 5:1, more preferably in the range of from 2:1 to 5:1, more preferably in the range of from 3:1 to 4:1, more preferably in the range of from 3.5:1 to 3.75:1, more preferably in the range of from 3.55:1 to 3.70:1, more preferably in the range of from 3.59:1 to 3.63:1.

In the mixture prepared in (i), it is preferred that the weight ratio of aluminum, calculated as element, relative to cobalt, calculated as element, Al:Co, is in the range of from 3:1 to 8:1, more preferably in the range of from 3.5:1 to 7:1, more preferably in the range of from 4:1 to 6:1, more preferably in the range of from 4.75:1 to 5.25:1, more preferably in the range of from 4.9:1 to 5.1.1.

It is preferred that the acid according to (i) is one or more of formic acid, acetic acid, propionic acid, nitric acid, nitrous acid, citric acid, tartaric acid, and oxalic acid, more preferably one or more of formic acid and nitric acid, more preferably formic acid.

In the mixture prepared in (i), the molar ratio of the acid relative to cobalt is preferably in the range of from 1:2 to 9:1, more preferably in the range of from 1:2 to 8:1, more preferably in the range of from 1:1 to 7:1, more preferably in the range of from 2:1 to 7:1, more preferably in the range of from 3.5:1 to 5:1, more preferably in the range of from 4.0:1 to 4.4:1, more preferably in the range of from 4.1:1 to 4.3:1.

The mixture prepared in (i) may comprise further components, for example a liquid that may be effective for dissolving at least a part of the components present in the mixture. It is preferred that the mixture prepared in (i) further comprises water, wherein more preferably from 20 to 40 weight-%, more preferably from 25 to 37.5 weight-%, more preferably from 30 to 35 weight-% of the mixture prepared in (i) consist of water.

Preferably, the mixture prepared in (i) substantially consists of the lanthanum salt, the cobalt salt, the oxidic aluminum compound, the acid, and preferably water. According to a first alternative, it is preferred that from 95 to 100 weight-%, more preferably from 98 to 100 weight-%, more preferably from 99 to 100 weight-% of the mixture prepared in (i) consist of the lanthanum salt, the cobalt salt, the oxidic aluminum compound, the acid, and preferably water. According to a second alternative, it is preferred that from 65 to 95 weight-%, more preferably from 75 to 95 weight-%, more preferably from 85 to 95 weight-% of the mixture prepared in (i) consist of the lanthanum salt, the cobalt salt, the oxidic aluminum compound, the acid, and preferably water.

Furthermore, the present invention relates to a process for preparing the molding comprising a mixed oxide as disclosed herein, the process comprising (i) preparing a mixture comprising a lanthanum salt, a cobalt salt, an oxidic aluminum compound, and an acid, wherein one or more of the lanthanum salt and the cobalt salt, preferably both the lanthanum salt and the cobalt salt are not a nitrate, comprising (i.1) preparing a premixture comprising the lanthanum salt, the cobalt salt, the oxidic aluminum compound, and optionally water;

(i.2) admixing the acid and preferably water with the premixture prepared in (i.1), obtaining the mixture;

(ii) preparing a molding from the mixture obtained from (i), comprising (ii.1) subjecting the mixture obtained from (i) to a shaping process, obtaining a first molding;

(ii.2) preferably drying the first molding obtained from (ii.1) in a gas atmosphere;

(ii.3) calcining the first molding obtained from (ii.1) or (ii.2), preferably from (ii.2), in a gas atmosphere having a temperature in the range of from 350 to 470° C.;

(iii) preferably subjecting the calcined first molding obtained from (ii) to a re-shaping process, obtaining a second molding having a geometry different from the geometry of the first molding;

(iv) calcining the molding obtained from (ii) or (iii), preferably from (iii), in a gas atmosphere having a temperature in the range of from 1100 to 1400° C., obtaining the molding comprising the mixed oxide.

It is preferred that preparing the mixture according to (i) comprises kneading the mixture.

Further, it is preferred that subjecting the mixture obtained from (i) to a shaping process according to (ii.1) comprises, more preferably consists of extruding.

According to a first alternative as regards the drying according to (ii.2), it is preferred that the first molding is dried in a gas atmosphere, the gas atmosphere preferably having a temperature in the range of from 50 to 150° C., more preferably in the range of from 70 to 140° C., more preferably in the range of from 80 to 110° C., wherein the gas atmosphere preferably comprises oxygen, more preferably is one or more of oxygen, air, or lean air, wherein the drying according to (ii.2) is performed preferably for 0.5 to 30 h, more preferably for 1 to 30 h, more preferably for 5 to 25 h, more preferably for 10 to 20 h.

According to a second alternative as concerns the drying according to (ii.2), it is preferred that the first molding is dried in a gas atmosphere, the gas atmosphere preferably having a temperature in the range of from 80 to 150° C., more preferably in the range of from 85 to 145° C., more preferably in the range of from 90 to 140° C., wherein the gas atmosphere preferably comprises oxygen, more preferably is one or more of oxygen, air, or lean air, wherein the drying according to (ii.2) is performed preferably for 0.2 to 2 h, more preferably for 0.3 to 1.2 h, more preferably for 0.4 to 1.1 h, more preferably for 0.5 to 1 h, wherein drying is preferably conducted using a belt dryer.

According to a first alternative as regards the calcining according to (ii.3), it is preferred that the first molding is calcined in a gas atmosphere having a temperature in the range of from 350 to 450° C., more preferably in the range of from 360 to 440° C., more preferably in the range of from 375 to 425° C., more preferably in the range of from 390 to 410° C. Further, it is preferred that the gas atmosphere comprises oxygen, more preferably is one or more of oxygen, air, or lean air Further, the calcining according to (ii.3) is performed preferably for 0.5 to 20 h, more preferably for 1 to 15 h, more preferably for 2 to 10 h, more preferably for 3 to 5 h.

According to a second alternative as regards the calcining according to (ii.3), it is preferred that the first molding is calcined according to (ii.3) in a rotary kiln in a gas atmosphere having a temperature in the range of from 350 to 450° C., more preferably in the range of from 360 to 440° C., more preferably in the range of from 375 to 425° C., more preferably in the range of from 390 to 410° C. Further, it is preferred that the gas atmosphere comprises oxygen, more preferably is one or more of oxygen, air, or lean air. In the case where the first molding is calcined according to (ii.3) as disclosed herein, it is preferred that calcining comprises separating carbon dioxide from the gas stream, more preferably with a carbon dioxide washer.

As regards the re-shaping according to (iii), it is preferred that re-shaping according to (iii) comprises crushing the calcined molding obtained from (ii) and subjecting the obtained crushed material to a re-shaping process, obtaining the second molding, wherein crushing is more preferably conducted by milling.

In the case where re-shaping comprises crushing the calcined molding obtained from (ii) and subjecting the obtained crushed material to a re-shaping process for obtaining the second molding, it is particularly preferred that after crushing the calcined molding obtained from (ii) and prior to subjecting the obtained crushed material to the re-shaping process according to (iii), the process further comprises preparing a mixture comprising the crushed material and one or more binders, more preferably one or more of graphite, a polysaccharide, a sugar alcohol and a synthetic polymer, more preferably one or more of graphite, a sugar alcohol, a synthetic polymer, cellulose, a modified cellulose and a starch, more preferably graphite, a sugar alcohol, a synthetic polymer, a microcrystalline cellulose, a cellulose ether, more preferably graphite, sorbitol, mannitol, polyethylene glycol (PEG), polyvinylpyrrolidone (PVP), hydroxypropyl cellulose (HPC) and hydroxypropyl methylcellulose (HPMC). In this regard, it is preferred according to a first alternative that in the mixture, the weight ratio of the one or more binders relative to the crushed material is preferably in the range of from 1:10 to 1:20, more preferably in the range of from 1:12 to 1:18, more preferably in the range of from 1:13 to 1:17. According to a second alternative, it is preferred that in the mixture, the weight of the one or more binders calculated with respect to the total weight of the mixture is in the range of from 0.5 to 10 weight-%, more preferably in the range of from 2 to 9 weight-%, more preferably in the range of from 4 to 8 weight-%, more preferably in the range of from 5 to 7 weight-%.

Further in the case where re-shaping comprises crushing the calcined molding obtained from (ii) and subjecting the obtained crushed material to a re-shaping process for obtaining the second molding, it is preferred that after crushing the calcined molding obtained from (ii) and prior to the re-shaping process according to (iii), the process further comprises separating the particles of the crushed material according to their size into two or more fractions. Preferably, the fractions of the particles with the smallest size, preferably the fraction of the particles with the smallest size, are/is subjected to the re-shaping process. Preferably, the particles with the smallest size have a maximum diameter of 2.0 mm, more preferably a maximum diameter of 1.5 mm, more preferably a maximum diameter of 1.0 mm. Fractions with even smaller maximum sizes, such as 0.75 mm or 0.5 mm, are generally conceivable.

In the case where a fraction or fractions of particles which do not have the smallest size is/are separated, it is particularly preferred to crush said fraction or fractions again to separate the fractions of the particles with the smallest size, preferably the fraction of the particles with the smallest size, for subjecting to the re-shaping process according to (iii). In accordance with the above, it is preferred that the particles with the smallest size have a maximum diameter of 2.0 mm, more preferably a maximum diameter of 1.5 mm, more preferably a maximum diameter of 1.0 mm, whereby fractions with even smaller maximum sizes, such as 0.75 mm or 0.5 mm, are also conceivable.

In the case where re-shaping comprises crushing the calcined molding obtained from (ii) and subjecting the obtained crushed material to a re-shaping process for obtaining the second molding, wherein prior to the re-shaping process according to (iii), the process further comprises separating the particles of the crushed material according to their size into two or more fractions, it is preferred that the process further comprises recycling at least a portion of the particles of the fraction or fractions which do not have the smallest size to step (i) of the process, comprising preparing the mixture according to (i) comprising the lanthanum salt, the cobalt salt, the oxidic aluminum compound, the acid, more preferably water, and at least the portion of said fractions.

Further, it is particularly preferred that from 65 to 95 weight-%, more preferably from 75 to 95 weight-%, more preferably from 85 to 95 weight-% of the mixture prepared in (i) consist of the lanthanum salt, the cobalt salt, the oxidic aluminum compound, the acid, and more preferably water, and from 5 to 35 weight-%, more preferably from 5 to 25 weight-%, more preferably from 5 to 15 weight-% of the mixture consist of said fractions.

It is particularly preferred that the particles of the fraction or fractions which do not have the smallest size are re-agglomerated, preferably by compaction. More preferably, the obtained reagglomerated particles are recycled in the re-shaping according to (iii). As a first alternative, the obtained re-agglomerated particles are recycled in the re-shaping according to (iii) alone, thus, as calcined first molding obtained from (ii). As a second alternative, the obtained re-agglomerated particles are recycled in the re-shaping according to (iii) together with the calcined first molding obtained from (ii).

Further, it is preferred that the re-shaping process according to (iii) comprises, more preferably consists of tableting.

As regards calcining the molding obtained from (ii) or (iii) according to (iv), it is preferred that (iv) comprises drying the molding obtained from (ii) or (iii), more preferably from (iii), prior to calcining, in a gas atmosphere having a temperature in the range of from 50 to 250° C., more preferably in the range of from 75 to 150° C., more preferably in the range of from 80 to 100° C., wherein the gas atmosphere preferably comprises oxygen, more preferably is one or more of oxygen, air, or lean air, wherein the drying is performed more preferably for 0.5 to 30, more preferably for 1 to 25 h, more preferably for 5 to 22 h, more preferably for 10 to 20 h.

As regards calcining the second molding according to (iv), it is preferred that the second molding is calcined in a gas atmosphere having a temperature in the range of from 1125 to 1275° C., more preferably in the range of from 1150 to 1250° C., more preferably in the range of from 1175 to 1225° C., wherein the gas atmosphere more preferably comprises oxygen, more preferably is one or more of oxygen, air, or lean air, wherein the calcining according to (iv) is performed more preferably for 0.5 to 20 h, more preferably for 1 to 15 h, more preferably for 2 to 10 h, more preferably for 3 to 5 h.

As regards the inventive process for preparing the molding comprising a mixed oxide as disclosed herein, it is preferred that the process consists of steps (i), (ii), (iii) and (iv), (iv) preferably comprising the drying as described above. In this regard, it is preferred that (i) is more preferably carried out prior to (ii), wherein (ii) is more preferably carried out prior to (iii), wherein (iii) is more preferably carried out prior to (iv), wherein (ii) is more preferably carried out after (i), wherein (iii) is more preferably carried out after (ii), wherein (iv) is more preferably carried out after.

Furthermore, the present invention relates to a molding comprising a mixed oxide, preferably the molding comprising a mixed oxide as disclosed herein, obtainable or obtained by a process as disclosed herein.

Yet further, the present invention relates to a molding comprising a mixed oxide, preferably the molding comprising a mixed oxide as disclosed herein, obtainable or obtained by a process as disclosed herein, wherein the molding has a four-hole cross-section, obtainable or obtained by a process as disclosed herein, the process for preparing the molding comprising the mixed oxide as disclosed herein, wherein the process consists of (i) preparing a mixture comprising a lanthanum salt, a cobalt salt, an oxidic aluminum compound, and an acid, wherein one or more of the lanthanum salt and the cobalt salt, preferably both the lanthanum salt and the cobalt salt are not a nitrate;

(ii) preparing a molding from the mixture obtained from (i), comprising
  (ii.1) subjecting the mixture obtained from (i) to a shaping process, obtaining a first molding;
  (ii.2) preferably drying the first molding obtained from (ii.1) in a gas atmosphere;
  (ii.3) calcining the first molding obtained from (ii.1) or (ii.2), preferably from (ii.2), in a gas atmosphere having a temperature in the range of from 350 to 470° C.

(iii) subjecting the calcined first molding obtained from (ii) to a re-shaping process, obtaining a second molding having a geometry different from the geometry of the first molding.

Furthermore, the present invention relates to a use of a molding as disclosed herein as a catalytically active material, as a catalyst component or as a catalyst, preferably for reforming one or more hydrocarbons, wherein the hydrocarbons are preferably selected from the group consisting of methane, ethane, propane, butane, and a mixture of two or more thereof, wherein the hydrocarbons are more preferably methane, to a synthesis gas comprising hydrogen and carbon monoxide, preferably in the presence of carbon dioxide.

Yet further, the present invention relates to a method for reforming one or more hydrocarbons, preferably methane, to a synthesis gas comprising hydrogen and carbon monoxide, the method comprising (a) providing a reactor comprising a reaction zone which comprises the molding of any one of the embodiments described herein;

(b) passing a reactant gas stream into the reaction zone obtained from (a), wherein the reactant gas stream passed into the reaction zone comprises the one or more hydrocarbons, carbon dioxide, and water; subjecting said reactant gas stream to reforming conditions in said reaction zone; and removing a product stream from said reaction zone, said product stream comprising hydrogen and carbon monoxide.

The unit bar(abs) refers to an absolute pressure wherein 1 bar equals $10^5$ Pa.

The present invention is further illustrated by the following set of embodiments and combinations of embodiments resulting from the dependencies and back-references as indicated. In particular, it is noted that in each instance where a range of embodiments is mentioned, for example in the context of a term such as "The molding of any one of embodiments 1 to 4", every embodiment in this range is meant to be explicitly disclosed for the skilled person, i.e. the wording of this term is to be understood by the skilled person as being synonymous to "The molding of any one of embodiments 1, 2, 3, and 4".

1. A molding comprising a mixed oxide, wherein the mixed oxide comprises oxygen, lanthanum, aluminum, and cobalt, wherein in the mixed oxide, the weight ratio of cobalt relative to aluminum, calculated as elements, Co:Al, is at least 0.17:1.

2. The molding of embodiment 1, wherein in the mixed oxide, the weight ratio of cobalt relative to aluminum, calculated as elements, Co:Al, is in the range of from 0.17:1 to 0.24:1, preferably in the range of from 0.18:1 to 0.23:1, more preferably in the range of from 0.19:1 to 0.22:1.

3. The molding of embodiment 1 or 2, wherein in the mixed oxide, the weight ratio of cobalt relative to lanthanum, calculated as elements, Co:La, is in the range of from 0.35:1 to 0.48:1, preferably in the range of from 0.38:1 to 0.45:1, more preferably in the range of from 0.40:1 to 0.43:1.

4. The molding of any one of embodiments 1 to 3, wherein from 99 to 100 weight-%, preferably from 99.5 to 100 weight-%, more preferably from 99.9 to 100 weight-% of the mixed oxide consist of oxygen, lanthanum, aluminum, cobalt, and optionally hydrogen.

5. The molding of any one of embodiments 1 to 4, wherein from 6 to 9 weight-%, preferably from 6.5 to 8.5 weight-%, more preferably from 7 to 8 weight-% of the mixed oxide consist of cobalt, calculated as element.

6. The molding of any one of embodiments 1 to 5, wherein from 15 to 20 weight-%, preferably from 16 to 19 weight-%, more preferably from 17 to 18 weight-%, more preferably from 17.5 to 17.8 weight-% of the mixed oxide consist of lanthanum, calculated as element.

7. The molding of any one of embodiments 1 to 6, wherein from 33 to 40 weight-%, preferably from 34 to 38 weight-%, more preferably from 35 to 37 weight-%, more preferably from 35.5 to 36.5 weight-% of the mixed oxide consist of aluminum calculated as element.

8. The molding of any one of embodiments 1 to 7, wherein from 80 to 100 weight-% of the mixed oxide is in crystalline form, preferably from 90 to 100 weight-%, more preferably from 92 to 100 weight-%.

9. The molding of any one of embodiments 1 to 8, wherein the mixed oxide comprises one or more crystalline phases, more preferably at least two crystalline phases, more preferably at least three crystalline phases.

10. The molding of any one of embodiments 1 to 9, wherein the mixed oxide comprises one or more of a crystalline phase of $LaCoAl_{11}O_{19}$ and a crystalline phase of $LaAl(Co)O_3$.

11. The molding of embodiment 10, wherein the mixed oxide comprises a crystalline phase of $LaCoAl_{11}O_{19}$ and a crystalline phase of $LaAl(Co)O_3$, wherein in the mixed oxide, the weight ratio of $LaCoAl_{11}O_{19}$ relative to $LaAl(Co)O_3$ is in the range of from 5:1 to 30:1, preferably in the range of from 10:1 to 25:1, more preferably in the range of from 12:1 to 22:1, more preferably in the range of from 13:1 to 20:1, more preferably in the range of from 13:1 to 15:1, determined via XRD as described in Reference Example 3.

12. The molding of embodiment 10 or 11, wherein the mixed oxide comprises a further crystalline phase $La(OH)_3$.

13. The molding of any one of embodiments 10 to 12, wherein the mixed oxide further comprises a crystalline phase $LaAlO_3$.

14. The molding of any one of embodiments 10 to 13, wherein the mixed oxide further comprises a crystalline phase $CoAl_2O_4$.

15. The molding of embodiment 14, wherein the mixed oxide comprises a crystalline phase of $LaCoAl_{11}O_{19}$, wherein in the mixed oxide, the weight ratio of $LaCoAl_{11}O_{19}$ relative to $CoAl_2O_4$ is in the range of from 8:1 to 35:1, preferably in the range of from 10:1 to 30:1, more preferably in the range of from 12:1 to 30:1, more preferably in the range of from 15:1 to 27:1, more preferably in the range of from 17:1 to 25:1, more preferably in the range of from 20:1 to 22:1, determined via XRD as described in Reference Example 3.

16. The molding of any one of embodiments 1 to 15, wherein the molding is not calcined, exhibiting a peak having a minimum in the range of from 2300 to 2400 nm in a UV/Vis spectrum, determined as described in Reference Example 4.

17. The molding of any one of embodiments 1 to 16, comprising from 0 to 10 mg sulfur per kg of the molding, preferably from 0 to 5 mg per kg, more preferably from 0 to 3 mg per kg, more preferably from 0 to 2.5 mg per kg, more preferably from 0 to 2 mg per kg.

18. The molding of any one of embodiments 1 to 17, comprising sulfur, preferably at most 10 mg per kg of the molding, more at most 5 mg per kg, more preferably at most 3 mg per kg, more preferably at most 2.5 mg per kg, more preferably at most 2 mg per kg.

19. The molding of any one of embodiments 1 to 18, wherein from 99 to 100 weight-%, preferably from 99.5 to 100 weight-%, more preferably from 99.9 to 100 weight-% of the molding consist of the mixed oxide.

20. The molding of any one of embodiments 1 to 19, being a tablet.

21. The molding of any one of embodiments 1 to 20, preferably according to embodiment 20, having a four-hole cross-section, the molding preferably being a tablet having a four-hole cross-section, the molding more preferably being a tablet having a four-hole cross-section and having four flutes, more preferably the molding being a tablet having a four-hole cross-section having a diameter in the range of from 15 to 19 mm, more preferably in the range of from 16 to 18 mm, more preferably in the range of from 16.7 to 16.8 mm, and a height in the range of from 9 to 11 mm, more preferably in the range of from 9.5 to 10.5 mm, more preferably in the range of from 9.7 to 10.0 mm.

22. The molding of embodiment 21, wherein the molding is a calcined molding, wherein the calcination has preferably been performed in a gas atmosphere having a temperature in the range of from 350 to 450° C., more preferably in the range of from 360 to 440° C., more preferably in the range of from 375 to 425° C., more preferably in the range of from 390 to 410° C., wherein the gas atmosphere more preferably comprised oxygen, more preferably was one or more of oxygen, air, or lean air, wherein the calcining was performed more preferably for 0.5 to 20, more preferably for 1 to 15 h, more preferably for 2 to 10 h, more preferably for 3 to 5 h.

23. The molding of embodiment 21 or 22, having a side crushing strength 1 (SCS1) of at least 70 N, preferably in the range of from 70 to 250 N, more preferably in the range of from 70 to 130 N, determined as described in Reference Example 5, the molding more preferably being a tablet having a four-hole cross-section and having four flutes, wherein four cylindrical segments are located in an area each between two flutes, wherein the side crushing strength 1 is measured according to Reference Example 5 in a condition where the molding stands on two cylindrical segments sided by a flute.

24. The molding of any one of embodiments 21 to 23, having a side crushing strength 2 (SCS2) of at least 60 N, preferably in the range of from 60 to 200 N, more preferably in the range of from 60 to 88 N, determined as described in Reference Example 5, the molding more preferably being a tablet having a four-hole cross-section and having four flutes, wherein four cylindrical segments are located in an area each between two flutes, wherein the side crushing strength 2 is measured according to Reference Example 5 in a condition where the molding stands on a cylindrical segment.

25. The molding of any one of embodiments 21 to 24, having a side crushing strength 3 (SCS3) of at least 190 N, preferably in the range of from 190 to 350 N, more preferably in the range of from 190 to 240 N, determined as described in Reference Example 5, the molding more preferably being a tablet having a four-hole cross-section and having four flutes, wherein four cylindrical segments are located in an area each between two flutes, wherein the side crushing strength 3 is measured according to Reference Example 5 in a condition where the area of the cylindrical segments is perpendicular to the direction of the force applied on the molding.

26. The molding of any one of embodiments 1 to 20, preferably according to embodiment 20, having a four-hole cross-section, the molding preferably being a tablet having a four-hole cross-section, the molding more preferably being a tablet having a four-hole cross-section and having four flutes, more preferably the molding being a tablet having a four-hole cross-section having a diameter in the range of from 13 to 18 mm, more preferably in the range of from 14.5 to 16.0 mm, more preferably in the range of from 15.0 to 15.5 mm, and a height in the range of from 7 to 11 mm, more preferably in the range of from 8.2 to 9.4 mm, more preferably in the range of from 8.6 to 9.0 mm.

27. The molding of embodiment 26, wherein the molding is a calcined molding, wherein the calcination has preferably been performed in a gas atmosphere having a temperature in the range of from 1100 to 1400° C., more preferably in the range of from 1125 to 1275° C., more preferably in the range of from 1150 to 1250° C., more preferably in the range of from 1175 to 1225° C., wherein the gas atmosphere more preferably comprised oxygen, more preferably was one or more of oxygen, air, or lean air, wherein the calcining was performed more preferably for 0.5 to 20 h, more preferably for 1 to 15 h, more preferably for 2 to 10 h, more preferably for 3 to 5 h.

28. The molding of embodiment 26 or 27, having a side crushing strength 1 (SCS1) of at least 366 N, preferably of at least 400 N, more preferably in the range of from 400 to 800 N, more preferably in the range of from 400 to 600 N, more preferably in the range of from 400 to 570 N, determined as described in Reference Example 1, the molding more preferably being a tablet having a four-hole cross-section and having four flutes, wherein four cylindrical segments are located in an area each between two flutes, wherein the side crushing strength 1 is measured according to Reference Example 1 in a condition where the molding stands on two cylindrical segments sided by a flute.

29. The molding of any one of embodiments 26 to 28, having a side crushing strength 2 (SCS2) of at least 170 N, preferably of at least 190 N, more preferably in the range of from 190 to 450 N, more preferably in the range of from 190 to 300 N, more preferably in the range of from 190 to 270 N, determined as described in Reference Example 1, the molding more preferably being a tablet having a four-hole cross-section and having four flutes, wherein four cylindrical segments are located in an area each between two flutes, wherein the side crushing strength 2 is measured according to Reference Example 1 in a condition where the molding stands on a cylindrical segment.

30. The molding of any one of embodiments 26 to 29, having a side crushing strength 3 (SCS3) of at least 345 N, preferably of at least 500 N, more preferably in the range of from 500 to 950 N, more preferably in the range of from 500 to 800 N, more preferably in the range of from 500 to 770 N, determined as described in Reference Example 1, the molding more preferably being a tablet having a four-hole cross-section and having four flutes, wherein four cylindrical segments are located in an area each between two flutes, wherein the side crushing strength 3 is measured according to Reference Example 1 in a condition where the area of the cylindrical segments is perpendicular to the direction of the force applied on the molding.

31. The molding of any one of embodiments 1 to 30, having a BET specific surface area in the range of from 1 to 10 $m^2/g$, preferably in the range of from 5 to 10 $m^2/g$, more preferably in the range of from 7 to 10 $m^2/g$, more preferably in the range of from 7.5 to 9.6 $m^2/g$, determined according to Reference Example 2.

32. The molding of any one of embodiments 1 to 31, having a Langmuir specific surface area in the range of from 1 to 15 $m^2/g$, preferably in the range of from 5 to 15 $m^2/g$, more preferably in the range of from 10 to 15 $m^2/g$, more preferably in the range of from 11.0 to 13.5 $m^2/g$, more preferably in the range of from 11.2 to 13.3 $m^2/g$, determined as described in Reference Example 2.

33. A process for preparing the molding comprising a mixed oxide of any one of embodiments 1 to 32, the process comprising
  (i) preparing a mixture comprising a lanthanum salt, a cobalt salt, an oxidic aluminum compound, and an acid, wherein one or more of the lanthanum salt and the cobalt salt, preferably both the lanthanum salt and the cobalt salt are not a nitrate;
  (ii) preparing a molding from the mixture obtained from (i), comprising
    (ii.1) subjecting the mixture obtained from (i) to a shaping process, obtaining a first molding;
    (ii.2) preferably drying the first molding obtained from (ii.1) in a gas atmosphere;
    (ii.3) calcining the first molding obtained from (ii.1) or (ii.2), preferably from (ii.2), in a gas atmosphere having a temperature in the range of from 350 to 470° C.;
  (iii) preferably subjecting the calcined first molding obtained from (ii) to a re-shaping process, obtaining a second molding having a geometry different from the geometry of the first molding;
  (iv) calcining the molding obtained from (ii) or (iii), preferably from (iii), in a gas atmosphere having a temperature in the range of from 1100 to 1400° C., obtaining the molding comprising the mixed oxide.

34. The process of embodiment 33, wherein the process comprises (iii).

35. The process of embodiment 33 or 34, wherein the lanthanum salt comprises, preferably is, one or more of a lanthanum carbonate, a lanthanum oxalate, a lanthanum acetate, a lanthanum tartrate, a lanthanum formate, a lanthanum sulfate, a lanthanum sulfide, a lanthanum fluoride, a lanthanum chloride, a lanthanum bromide, and a lanthanum iodide, more preferably a lanthanum carbonate, wherein the lanthanum carbonate more preferably comprises, more preferably is $La_2(CO_3)_3 \cdot x\, H_2O$, wherein $0 \leq x \leq 10$, more preferably $0 \leq x \leq 6$.

36. The process of any one of embodiments 33 to 35, wherein the cobalt salt comprises, preferably is, one or more of a cobalt carbonate, a cobalt oxalate, a cobalt acetate, a cobalt tartrate, a cobalt formate, a cobalt sulfate, a cobalt sulfide, a cobalt fluoride, a cobalt chloride, a cobalt bromide, and a cobalt iodide, more preferably a cobalt carbonate, more preferably a cobalt carbonate, wherein the cobalt carbonate more preferably comprises, more preferably is $CoCO_3 \cdot y\, H_2O$, wherein $0 \leq y \leq 7$, preferably $0 \leq y \leq 6$.

37. The process of any one of embodiments 33 to 36, wherein the oxidic aluminum compound comprises, preferably is one or more of AlOOH (boehmite), $Al_2O_3$, and $Al(OH)_3$, wherein more preferably, the oxidic aluminum compound comprises, more preferably is AlOOH.

38. The process of any one of embodiments 33 to 37, wherein the oxidic aluminum compound has a BET specific surface area in the range of from 150 to 220 $m^2/g$, preferably in the range of from 170 to 200 $m^2/g$, more preferably in the range of from 180 to 190 $m^2/g$, determined according to Reference Example 2.

39. The process of any one of embodiments 33 to 38, wherein the oxidic aluminum compound has a bulk density in the range of from 0.40 to 0.60 g/ml, preferably in the range of from 0.45 to 0.53 g/ml, more preferably in the range of from 0.47 to 0.51 g/ml.

40. The process of any one of embodiments 33 to 39, wherein in the mixture prepared in (i), the weight ratio of lanthanum calculated as element relative to aluminum, calculated as element, La:Al, is in the range of from 0.37:1 to 1:1, preferably in the range of from 0.5:1 to 1:1, more preferably in the range of from 0.6:1 to 0.9:1, more preferably in the range of from 0.65:1 to 0.8:1, more preferably in the range of from 0.70:1 to 0.75:1.

41. The process of any one of embodiments 33 to 40, wherein in the mixture prepared in (i), the weight ratio of lanthanum calculated as element relative to cobalt, calculated as element, La:Co, is in the range of from 1.5:1 to 5:1, preferably in the range of from 2:1 to 5:1, more preferably in the range of from 3:1 to 4:1, more preferably in the range of from 3.5:1 to 3.75:1, more preferably in the range of from 3.55:1 to 3.70:1, more preferably in the range of from 3.59:1 to 3.63:1.

42. The process of any one of embodiments 33 to 41, wherein in the mixture prepared in (i), the weight ratio of aluminum calculated as element relative to cobalt, calculated as element, Al:Co, is in the range of from 3:1 to 8:1, preferably in the range of from 3.5:1 to 7:1, more preferably in the range of from 4:1 to 6:1, more preferably in the range of from 4.75:1 to 5.25:1, more preferably in the range of from 4.9:1 to 5.1:1.

43. The process of any one of embodiments 33 to 42, wherein the acid according to (i) is one or more of formic acid, acetic acid, propionic acid, nitric acid, nitrous acid, citric acid, tartaric acid, and oxalic acid, preferably one or more of formic acid and nitric acid, more preferably formic acid.

44. The process of any one of embodiments 33 to 43, wherein in the mixture prepared in (i), the molar ratio of the acid relative to cobalt is in the range of from 1:2 to 9:1, preferably in the range of from 1:2 to 8:1, more preferably in the range of from 1:1 to 7:1, more preferably in the range of from 2:1 to 6:1, more preferably in the range of from 3.5:1 to 5:1, more preferably in the range of from 4.0:1 to 4.4:1, preferably in the range of from 4.1:1 to 4.3:1.

45. The process of any one of embodiments 33 to 44, wherein the mixture prepared in (i) further comprises water, wherein preferably from 20 to 40 weight-%, more preferably from 25 to 37.5 weight-%, more preferably from 30 to 35 weight-% of the mixture prepared in (i) consist of water.

46. The process of any one of embodiments 33 to 45, wherein from 95 to 100 weight-%, preferably from 98 to 100 weight-%, more preferably from 99 to 100 weight-% of the mixture prepared in (i) consist of the lanthanum salt, the cobalt salt, the oxidic aluminum compound, the acid, and preferably water.

47. The process of any one of embodiments 33 to 45, wherein from 65 to 95 weight-%, preferably from 75 to 95 weight-%, more preferably from 85 to 95 weight-% of the mixture prepared in (i) consist of the lanthanum salt, the cobalt salt, the oxidic aluminum compound, the acid, and preferably water.

48. The process of any one of embodiments 33 to 47, wherein (i) comprises
   (i.1) preparing a premixture comprising the lanthanum salt, the cobalt salt, the oxidic aluminum compound, and optionally water;
   (i.2) admixing the acid and preferably water with the premixture prepared in (i.1), obtaining the mixture.

49. The process of any one of embodiments 33 to 48, wherein preparing the mixture according to (i) comprises kneading the mixture.

50. The process of any one of embodiments 33 to 49, wherein subjecting the mixture obtained from (i) to a shaping process according to (ii.1) comprises, preferably consists of extruding.

51. The process of any one of embodiments 33 to 50, wherein according to (ii.2), the first molding is dried in a gas atmosphere having a temperature in the range of from 50 to 150° C., more preferably in the range of from 70 to 140° C., more preferably in the range of from 80 to 110° C., wherein the gas atmosphere preferably comprises oxygen, more preferably is one or more of oxygen, air, or lean air, wherein the drying according to (ii.2) is performed preferably for 0.5 to 30 h, more preferably for 1 to 30 h, more preferably for 5 to 25 h, more preferably for 10 to 20 h.

52. The process of any one of embodiments 33 to 50, wherein according to (ii.2), the first molding is dried in a gas atmosphere having a temperature in the range of from 80 to 150° C., more preferably in the range of from 85 to 145° C., more preferably in the range of from 90 to 140° C., wherein the gas atmosphere preferably comprises oxygen, more preferably the gas atmosphere is one or more of oxygen, air, or lean air, wherein the drying according to (ii.2) is performed more preferably for 0.2 to 2 h, more preferably for 0.3 to 1.2 h, more preferably for 0.4 to 1.1 h, more preferably for 0.5 to 1 h, wherein drying is preferably conducted using a belt dryer.

53. The process of any one of embodiments 33 to 52, wherein according to (ii.3) the first molding is calcined in a gas atmosphere having a temperature in the range of from 350 to 450° C., preferably in the range of from 360 to 440° C., more preferably in the range of from 375 to 425° C., more preferably in the range of from 390 to 410° C., wherein the gas atmosphere preferably comprises oxygen, more preferably the gas atmosphere is one or more of oxygen, air, or lean air, wherein the calcining according to (ii.3) is performed preferably for 0.5 to 20 h, more preferably for 1 to 15 h, more preferably for 2 to 10 h, more preferably for 3 to 5 h.

54. The process of any one of embodiments 33 to 52, wherein according to (ii.3) the first molding is calcined in a rotary kiln in a gas atmosphere having a temperature in the range of from 350 to 450° C., preferably in the range of from 360 to 440° C., more preferably in the range of from 375 to 425° C., more preferably in the range of from 390 to 410° C., wherein the gas atmosphere preferably comprises oxygen, more preferably is one or more of oxygen, air, or lean air.

55. The process of embodiment 53 or 54, wherein calcining comprises separating carbon dioxide from the gas stream, preferably with a carbon dioxide washer.

56. The process of any one of embodiments 33 to 55, wherein re-shaping according to (iii) comprises crushing the calcined molding obtained from (ii) and subjecting the obtained crushed material to a re-shaping process, obtaining the second molding, wherein crushing is preferably conducted by milling.

57. The process of embodiment 56, wherein after crushing the calcined molding obtained from (ii) and prior to subjecting the obtained crushed material to the re-shaping process according to (iii), the process further comprises preparing a mixture comprising the crushed material and one or more binders, preferably one or more of graphite, a polysaccharide, a sugar alcohol and a synthetic polymer, more preferably one or more of graphite, a sugar alcohol, a synthetic polymer, cellulose, a modified cellulose and a starch, more preferably graphite, a sugar alcohol, a synthetic polymer, a microcrystalline cellulose, a cellulose ether, more preferably graphite, sorbitol, mannitol, polyethylene glycol (PEG), polyvinylpyrrolidone (PVP), hydroxypropyl cellulose (HPC) and hydroxypropyl methylcellulose (HPMC),
wherein in the mixture, the weight ratio of the one or more binders relative to the crushed material is preferably in the range of from 1:10 to 1:20, more preferably in the range of from 1:12 to 1:18, more preferably in the range of from 1:13 to 1:17.

58. The process of embodiment 56, wherein after crushing the calcined molding obtained from (ii) and prior to subjecting the obtained crushed material to the re-shaping process according to (iii), the process further comprises preparing a mixture comprising the crushed material and one or more binders, preferably one or more of graphite, a polysaccharide, a sugar alcohol and a synthetic polymer, more preferably one or more of graphite, a sugar alcohol, a synthetic polymer, cellulose, a modified cellulose and a starch, more preferably graphite, a sugar alcohol, a synthetic polymer, a microcrystalline cellulose, a cellulose ether, more preferably graphite, sorbitol, mannitol, polyethylene glycol (PEG), polyvinylpyrrolidone (PVP), hydroxypropyl cellulose (HPC) and hydroxypropyl methylcellulose (HPMC),
wherein in the mixture, the weight of the one or more binders calculated with respect to the total weight of the mixture is in the range of from 0.5 to 10 weight-%, more preferably in the range of from 2 to 9 weight-%, more preferably in the range of from 4 to 8 weight-%, more preferably in the range of from 5 to 7 weight-%.

59. The process of any one of embodiments 56 to 58, wherein after crushing the calcined molding obtained from (ii) and prior to subjecting the obtained crushed material to the reshaping process according to (iii), the process further comprises separating the particles of the crushed material according to their size into two or more fractions, wherein the fraction of the particles with the smallest size is preferably subjected to the re-shaping process.

60. The process of embodiment 59, wherein the particles with the smallest size have a maximum diameter of 2.0 mm, preferably a maximum diameter of 1.5 mm, more preferably a maximum diameter of 1.0 mm.

61. The process of embodiment 59 or 60, wherein the fraction or fractions of particles which do not have the smallest size is/are separated, said fraction or fractions are crushed again to separate the fractions of the particles with the smallest size, preferably the fraction of the particles with the smallest size, for subjecting to the re-shaping process according to (iii), wherein the particles with the smallest size preferably have a maximum diameter of 2.0 mm, more preferably a maximum diameter of 1.5 mm, more preferably a maximum diameter of 1.0 mm.

62. The process of any one of embodiments 59 to 61, further comprising recycling at least a portion of the particles of the fraction or fractions which do not have the smallest size to step (i) of the process, comprising preparing the mixture according to (i) comprising the lanthanum salt, the cobalt salt, the oxidic aluminum compound, the acid, preferably water, and at least the portion of said fractions.

63. The process of embodiment 62, wherein from 65 to 95 weight-%, preferably from 75 to 95 weight-%, more preferably from 85 to 95 weight-% of the mixture prepared in (i) consist of the lanthanum salt, the cobalt salt, the oxidic aluminum compound, the acid, and preferably water, and from 1 to 35 weight-%, preferably from 3 to 25 weight-%, more preferably from 5 to 15 weight-% of the mixture consist of at least the fraction or fractions which do not have the smallest size.

64. The process of any one of embodiments 59 to 63, wherein the particles of the fraction or fractions which do not have the smallest size are re-agglomerated, preferably by compaction, wherein the obtained re-agglomerated particles are preferably recycled in the reshaping according to (iii).

65. The process of embodiment 64, wherein the obtained re-agglomerated particles are recycled in the re-shaping according to (iii) as calcined first molding obtained from (ii).

66. The process of embodiment 64, wherein the obtained re-agglomerated particles are recycled in the re-shaping according to (iii) together with the calcined first molding obtained from (ii).

67. The process of any one of embodiments 33 to 66, wherein the re-shaping process according to (iii) comprises, preferably consists of tableting.

68. The process of any one of embodiments 33 to 67, wherein (iv) comprises drying the molding obtained from (ii) or (iii), preferably from (iii), prior to calcining, in a gas atmosphere having a temperature in the range of from 50 to 250° C., preferably in the range of from 75 to 150° C., more preferably in the range of from 80 to 100° C., wherein the gas atmosphere preferably comprises oxygen, more preferably is one or more of oxygen, air, or lean air, wherein the drying is performed preferably for 0.5 to 30 h, more preferably for 1 to 25 h, more preferably for 5 to 22 h, more preferably for 10 to 20 h.

69. The process of any one of embodiments 33 to 68, wherein according to (iv), the second molding is calcined in a gas atmosphere having a temperature in the range of from 1125 to 1275° C., preferably in the range of from 1150 to 1250° C., more preferably in the range of from 1175 to 1225° C., wherein the gas atmosphere preferably comprises oxygen, more preferably is one or more of oxygen, air, or lean air, wherein the calcining according to (iv) is performed preferably for 0.5 to 20 h, more preferably for 1 to 15 h, more preferably for 2 to 10 h, more preferably for 3 to 5 h.

70. The process of any one of embodiments 33 to 69, consisting of steps (i), (ii), (iii) and (iv), wherein (i) is preferably carried out prior to (ii), wherein (ii) is more preferably carried out prior to (iii), wherein (iii) is more preferably carried out prior to (iv), wherein (ii) is more preferably carried out after (i), wherein (iii) is more preferably carried out after (ii), wherein (iv) is more preferably carried out after.

71. A molding comprising a mixed oxide comprising oxygen, lanthanum, aluminum, and cobalt, preferably the molding of any one of embodiments 1 to 32, obtainable or obtained by a process according to any one of embodiments 33 to 70.

72. A molding, preferably the molding of any one of embodiments 21 to 25, obtainable or obtained by a process according to any one of embodiments 33 to 69, wherein the process of embodiment 33 consists of steps (i), (ii), and (iii).

73. Use of a molding of any one of embodiments 1 to 32 and 71 to 72 as a catalytically active material, as a catalyst component or as a catalyst, preferably for reforming one or more hydrocarbons, wherein the hydrocarbons are preferably selected from the group consisting of methane, ethane, propane, butane, and a mixture of two or more thereof, wherein the hydrocarbons are more preferably methane, to a synthesis gas comprising hydrogen and carbon monoxide, preferably in the presence of carbon dioxide.

74. A method for reforming one or more hydrocarbons, preferably for reforming methane, to a synthesis gas comprising hydrogen and carbon monoxide, the method comprising (a) providing a reactor comprising a reaction zone which comprises the molding of any one of embodiments 1 to 32 and 71 to 72;

(b) passing a reactant gas stream into the reaction zone obtained from (a), wherein the reactant gas stream passed into the reaction zone comprises the one or more hydrocarbons, carbon dioxide, and water; subjecting said reactant gas stream to reforming conditions in said reaction zone; and removing a product stream from said reaction zone, said product stream comprising hydrogen and carbon monoxide.

The present invention is further illustrated by the following Examples and Reference Examples.

EXAMPLES

Reference Example 1: Determination of the Side Crushing Strength

The side crushing strength was determined on a semi-automatic tablet testing system SotaxST50 WTDH. The side crushing strength was measured with a constant speed of 0.05 mm/s. A range of from 0 to 800 N could be tested. For each measurement, the orientation of the sample was adjusted with a horizontal rotating table and fine adjustment has been made manually. Further, several measurement parameters were adjusted—if applicable—depending on the orientation and properties of the sample, such as the mass, the height/thickness, the diameter and strength at rupture. The gained data were evaluated with the scientific program q-doc prolab (version 4fsp2 (4.10)). Moldings having a four-hole cross-section were tested, whereby three positions being perpendicular to each other were probed allowing determination of the side crushing strength 1, side crushing strength 2 and side crushing strength 3. The relative standard deviation for crushing strength 1, 2, and 3 was 7.48%.

As can be seen in FIG. 1, side crushing strength 1 refers to a position of the molding in the semi-automatic tablet testing system where the sample stands on two cylindrical segments sided by a flute on the rotating table, side crushing strength 2 refers to a position where the sample stands on one cylindrical segment on the rotating table, and side crushing strength 3 refers to a position where the holes are in parallel to the direction of the force applied on the sample during the test.

Reference Example 2: Determination of the BET Specific Surface Area and the Langmuir Specific Surface Area The BET specific surface area and the Langmuir specific surface area were determined via nitrogen physisorption at 77K according to the method disclosed in DIN 66131.

Reference Example 3: Determination of Crystallinity Via XRD

Powder X-ray Diffraction (PXRD) data were collected using a laboratory diffractometer (D8 Discover, Bruker AXS GmbH, Karlsruhe). The instrument was set up with a Molybdenum X-ray tube. The characteristic K-alpha radiation was monochromatized using a bent Germanium Johansson type primary monochromator. Data were collected in the Bragg-Brentano reflection geometry. A LYNXEYE area detector was utilized to collect the scattered X-ray signal.

The powders were ground using an IKA Tube Mill and an MT40.100 disposable grinding chamber. The powder was placed in a sample holder and flattened using a glass plate. Data analysis was performed using DIFFRAC.EVA V4 and DIFFRAC.TOPAS V4 software (Bruker AXS GmbH). DIF-FRAC.EVA was used to estimate the crystallinity. Default values were used as input for the algorithm (DIFFRAC.EVA User Manual, 2014, Bruker AXS GmbH, Karlsruhe). All other parameters were determined using DIFFRAC.TOPAS. The entire diffraction pattern was simulated using the crystal structures of hexagonal $LaCoAl_{11}O_{19}$, rhombohedral $LaAlO_3$, cubic $CoAl_2O_4$, hexagonal $La(OH)_3$, cubic Co-doped $LaAlO_3$ and Corundum. During the simulation 29 parameters were refined to fit the simulated diffraction to the measured data.

The parameters are listed in the following Table 1.

TABLE 1

| Parameters for refining | | |
|---|---|---|
| Parameter | Structure | No. of variables |
| Background via Chebychev polynomial | global | 2 |

TABLE 1-continued

| Parameters for refining | | |
|---|---|---|
| Parameter | Structure | No. of variables |
| Background via peak at ca. 6.6° 2theta | global | 3 |
| Specimen displacement | global | 1 |
| | hexagonal $LaCoAl_{11}O_{19}$ | |
| Crystallite size | | 1 |
| Scale factor | | 1 |
| Lattice | | 2 |
| Preferred orientation* | | 1 |
| | cubic Co-doped $LaAlO_3$ | |
| Crystallite size | | 1 |
| Scale factor | | 1 |
| Lattice | | 1 |
| Co doping factor | | 1 |
| | rhombohedral $LaAlO_3$ | |
| Crystallite size | | 1 |
| Scale factor | | 1 |
| Lattice | | 2 |
| | Corundum | |
| Crystallite size | | 1 |
| Scale factor | | 1 |
| Lattice | | 2 |
| | cubic $CoAl_2O_4$ | |
| Crystallite size | | 1 |
| Scale factor | | 1 |
| Lattice | | 1 |
| | hexagonal $La(OH)_3$ | |
| Scale factor | | 1 |
| Lattice | | 2 |

*Using the March-Dollase model along the (110) direction.

All crystal structures used were retrieved from the inorganic crystal structure database (ICSD) (ICSD, FIZ Karlsruhe (https://icsd.fiz-karlsruhe.de/)) or the Pearson's Crystal Data (PCD) (Pearson's Crystal Data—Crystal Structure Database for Inorganic Compounds, Release 2016/2017, ASM International, Materials Park, Ohio, USA). The following Table 2 lists the reference numbers of the structures used.

TABLE 2

| Numbers of structures used | | |
|---|---|---|
| | ICSD Number | PCD Number |
| hexagonal $LaCoAl_{11}O_{19}$ | | 1502158 |
| cubic Co-doped $LaAlO_3$ | | 1501066 |
| rhombohedral $LaAlO_3$ | 28629 | |
| Corundum | | 1520618 |
| cubic $CoAl_2O_4$ | 163275 | |
| hexagonal $La(OH)_3$ | 192271 | |

The crystallite size values are those reported as Lvol-FWHM in DIFFRAC.TOPAS. To ensure reliable crystallite size values the geometry of the diffractometer was entered into the software to enable the calculation of the instrumental resolution based on the fundamental parameter approach (DIFFRAC.TOPAS User Manual, 2014, Bruker AXS GmbH, Karlsruhe). Scale factors were recomputed into mass percent values by DIFFRAC.TOPAS and have been reported.

Reference Example 4: Determination of UV/Vis Spectrum

UV/Vis data were collected using a spectrophotometer (Cary 5000 spectrophotometer; performance range from 175 to 3300 nm; controlled by Cary WinUV software). The apparatus was calibrated with a white standard. A sample was tested using a sample cell. Further, an External Diffuse Reflectance Accessories (DRAs) and a powder cell kit were used. The powder cell kit contained a pre-packed PTFE cell for use as a reflectance standard and an empty powder cell holder for sample measurements. Each cell had a quartz window and measures samples across 200 to 2500 nm wavelength ranges.

Reference Example 5: Determination of the Side Crushing Strength

The side crushing strength was determined on a tablet testing system (Typ BZ2.5/TS1S, Zwick). The side crushing strength was been measured using a punching tool. The side crushing strength was recorded as soon as the sample broke. For each measurement, the orientation of the sample was adjusted manually on a horizontal table. The punching tool was arranged to punch from above. Further, several measurement parameters were adjusted—if applicable—depending on the orientation and properties of the sample, such as the mass, the height/thickness, the diameter and strength at rupture. Moldings having a four-hole cross-section were tested, whereby three positions being perpendicular to each other were probed allowing determination of the side crushing strength 1, side crushing strength 2 and side crushing strength 3. As can be seen in FIG. 1, side crushing strength 1 refers to a position of the molding in the semi-automatic tablet testing system where the sample stands on two cylindrical segments sided by a flute on the rotating table, side crushing strength 2 refers to a position where the sample stands on one cylindrical segment on the rotating table, and side crushing strength 3 refers to a position where the holes are in parallel to the direction of the force applied on the sample during the test.

Example 1: Preparation of an Inventive Molding 70 kg aqueous AlOOH (Disperal; Sasol; containing 77.6 weight-% of Al calculated as $Al_2O_3$), 13.04 kg cobalt(II) carbonate hydrate (containing 55.92 weight-% of Co, calculated as CoO; Umicore), 49.27 kg lanthanum(III)carbonate hydrate (containing 49.26 weight-% La calculated as $La_2O_3$; Inner Mongolia) were pre-mixed for several minutes in a Koller or in a mixer. Then, 50.79 kg aqueous formic acid (containing 37 weight-% formic acid; based on formic acid having 98-100 weight-%, Bernd Kraft GmbH, CAS #: 64-18-6) were added in three portions, wherein the first portion contains about 50 weight-%, the second and the third portion each about 25 weight % of the total aqueous formic acid, under mixing and a dough-like homogeneous pink mass was formed. The obtained mass was then extruded to strands with 4 mm in diameter. The extrudates were dried at 90° C. for 16 hours. Subsequently, the dried extrudates were calcined in air at 400° C. for 4 hours. Thereafter, the calcined extrudates were grinded. Then, the material was sieved using sieves with a mesh of 1000 micrometer. The sieved powder was then mixed with 3 weight-% graphite (Asbury Graphite 3160) and 3 weight-% microcrystalline cellulose (Vivapur SCG102). The resulting mixture was tableted to moldings having a four-hole cross-section as shown in FIG. 1. Ten samples of the moldings were characterized as concerns the side crushing strengths, the diameter and the height. The moldings had a side crushing strength 1 of (100±29) N, a side crushing strength 2 of (75±11.9) N and a side crushing strength 3 of (217±22.1) N, determined according to Reference Example 1. The diameter of a molding was 16.74 mm and the height was 9.84 mm. For calcination, the moldings were heated within 3 hours to a temperature of 700° C. and said temperature was hold for 1 hour. Then the moldings were heated further to a temperature in the range of from 1170 to 1200° C., and the temperature was hold in this range for 4 hours. The calcination was done in an annealing furnace. The cobalt content of the calcined moldings was 7.4 weight-%, the lanthanum content 17.7 weight-% and the aluminum content 36 weight-%, calculated as the elements, respectively. Five samples of the finally calcined moldings of Example 1 were characterized as concerns the side crushing strength 1, 2, and 3, determined according to Reference Example 1. The results are listed in table 1 below. Further, the diameter, the height and the mass of each sample is listed in Table 3.

TABLE 3

Results for testing the side crushing strength 1, 2 and 3 for five samples

| # | Sample 1 | Sample 2 | Sample 3 | Sample 4 | Sample 5 |
|---|---|---|---|---|---|
| SCS1 [N] | 507 | 459 | 422 | 561 | 500 |
| SCS2 [N] | 236 | 202 | 260 | 259 | 256 |
| SCS3 [N] | 563 | 530 | 636 | 763 | 636 |
| Diameter [mm] | 15.24 | 15.09 | 15.18 | 15.29 | 15.5 |
| Height [mm] | 8.90 | 8.72 | 8.82 | 8.79 | 8.88 |
| Mass | 1.923 | 1.845 | 1.924 | 1.946 | 1.971 |

Four samples of the calcined moldings of example 1 have been characterized as concerns the BET specific surface area and the Langmuir specific surface area, determined according to Reference Example 2. The results are listed in Table 4 below.

TABLE 4

Results for testing the BET specific surface area and the Langmuir specific surface area for four samples

| # | Sample A | Sample B | Sample C | Sample D |
|---|---|---|---|---|
| BET [m²/g] | 9.3 | 9.3 | 8.0 | 8.6 |
| Langmuir [m²/g] | 13.2 | 13.1 | 11.3 | 12.2 |

Comparative Example 2: Preparation of a Molding According to the Prior Art as Regards a Comparison of the Catalytic Activity Comparative Example 2 was prepared in accordance with WO 2013/118078 A1.

6.000 kg aqueous AlOOH (Disperal; Sasol; containing 78.1 weight-% of Al calculated as $Al_2O_3$), 2.042 kg cobalt (II)nitrate hexahydrate (containing 25.7 weight-% of Co, calculated as CoO; Merck), 4.962 kg lanthanum(III)nitrate hexahydrate (containing 37.6 weight-% La calculated as $La_2O_3$; Sigma-Aldrich) were mixed for several minutes in a kneader or in a mixer. Then, 0.68 kg deionized water were added. Under mixing a dough-like homogeneous pink mass was formed. The obtained mass was then extruded to strands with 4 mm in diameter. The extrudates were dried at 105° C. for 16 hours. Subsequently, the dried extrudates were calcined in air at 520° C. for 2 hours. Thereafter, the calcined extrudates were grinded. The split fraction between 0.5 to 1.0 mm was calcined. The split was heated within 4.5 hours to a temperature of 1100° C., and said temperature was hold for 30 hours. The calcination was done in an annealing furnace. The cobalt content of the calcined moldings was 5.4 weight-%, the lanthanum content 22.6 weight-% and the aluminum content 35 weight-%, calculated as the elements, respectively.

Comparative Example 3: Preparation of a Molding According to the Prior Art as Regards a Comparison of the Mechanical Strength Comparative Example 3 was prepared in accordance with WO 2013/118078 A1.

21.57 kg aqueous AlOOH (Disperal; Sasol; containing 78.0 weight-% of Al calculated as $Al_2O_3$), 39.01 kg $Al_2O_3$ (Puralox SCCa 150/200; Sasol; containing 99.1 weight-% of Al calculated as $Al_2O_3$), 22.9 kg cobalt(II)nitrate hexahydrate (containing 20.0 weight-% of Co, calculated as element; Sheperd), 56.52 kg lanthanum(III)nitrate hexahydrate (containing 37.5 weight-% La calculated as $La_2O_3$; Treibacher) were mixed for several minutes in a kneader or in a mixer. Then, 9.8 kg deionized water were added. Under mixing a dough-like homogeneous pink mass was formed. The obtained mass was then extruded to strands with 4 mm in diameter. The extrudates were dried at 140° C. for 16 hours. Subsequently, the dried extrudates were calcined in air at 550° C. for 4 hours, with a period of 2 h at 280° C. during heating up to allow for NOx evolution.

Then, the material was sieved using sieves with a mesh of 1000 micrometer. The sieved powder was then mixed with 3 weight-% graphite (Asbury Graphite 3160) and 3 weight-% microcrystalline cellulose (Spheres 2000). The resulting mixture was tableted to moldings having a four-hole cross-section as shown in FIG. 1. Ten samples of the moldings were characterized as concerns the side crushing strengths, the diameter and the height. The moldings had a side crushing strength 1 of (175±53) N, a side crushing strength 2 of (57±6) N, determined according to Reference Example 5. The diameter of a molding was 16.79 mm and the height was 10.50 mm. For calcination, the moldings were heated within 5 hours to a temperature of 1200° C., and said temperature was hold for 4 hours. The calcination was done in an annealing furnace. The cobalt content of the calcined moldings was 5.6 weight-%, the lanthanum content 22.2 weight-% and the aluminum content 36 weight-%, calculated as the elements, respectively. Ten samples of the finally calcined moldings were characterized as concerns the side crushing strength 1, 2, and 3, determined according to Reference Example 5. The results are listed in table 5 below. Further, the diameter, the height and the mass of each sample is listed in Table 5.

TABLE 5

Results for testing the side crushing strength 1, 2 and 3

| # | Sample |
|---|---|
| SCS1 [N] | 283 |
| SCS2 [N] | 143 |
| SCS3 [N] | 232 |
| Diameter [mm] | 15.36 |
| Height [mm] | 9.73 |
| Mass | 2.2 |

When comparing the results for the side crushing strength 1, 2, and 3 for the moldings in accordance with the Inventive Example 1 as shown in table 3 with the results for Comparative Example 3 as shown in above table 5, it can be seen that each of the side crushing strength 1, 2, and 3 is clearly lower for the molding of Comparative Example 3 even though it was tableted and calcined at similar conditions according to Inventive Example 1. Therefore, the molding according to the present invention shows superior properties in particular with regard to the mechanical strength in comparison to the molding according to Comparative Example 3 representing the prior art.

Example 4: Catalytic Performance of Inventive Example 1 and of Comparative Example 2

Catalytic tests were performed on a single reactor test unit. This unit allowed for test conditions in a broad temperature and pressure regime up to 1100° C. and 20 bar (gauge). As gas feeds carbon dioxide (also designated as carbon dioxide-in or $CO_2$-in), methane (also designated as methane-in or $CH_4$-in), hydrogen (also designated as hydrogen-in), nitrogen (also designated as nitrogen-in) and argon (also designated as argon-in) were provided and online controlled by mass flow controllers (MFCs). Water was added as steam to the feed stream by an evaporator connected to a water reservoir. Analysis of the product gas composition was carried out by online-gas chromatography using argon as internal standard. Gas chromatographic analytics allowed the quantification of hydrogen, carbon monoxide, carbon dioxide (also designated as $CO_2$-out), methane (also designated as $CH_4$-out) and $C_2$ components. Duration of the gas chromatographic method was set to 24 min. For the catalytic test, the prepared molding was split (0.5 to 1.0 mm) and 15 ml of the split were then tested as a catalyst. The sample was placed in the isothermal zone of the reactor using a ceramic fitting. Prior to the start of the experiment the back pressure was determined. The catalyst was tested according to a standard test protocol according to Table 6.

In addition, the relative conversions of methane [3] and carbon dioxide [4] were calculated and represent the conversions related to the thermodynamic maximum conversions X_max (equilibrium composition). The equilibrium composition was calculated taking the test conditions accordingly into account:

$$\text{Methane-relative conversion: } X\_rel(CH_4)=X(CH_4)/X\_max(CH_4) \qquad [3]$$

$$\text{Carbon dioxide-relative conversion: } X\_rel(CO_2)=X(CO_2)/X\_max(CO_2) \qquad [4]$$

The experimental values for the relative methane and carbon dioxide conversion were averaged (averaged methane is designated as a-$CH_4$ and averaged carbon dioxide is designated as a-$CO_2$) over time on stream for each reaction phase (n=number of measurement points) according to equation [5] and [6].

$$a\text{-}CH_4=1/n\Sigma[X\_rel(CH_4)] \qquad [5]$$

$$a\text{-}CO_2=1/n\Sigma[X\_rel(CO_2)] \qquad [6]$$

As it can be gathered from FIG. 2 for Inventive Example 1, the absolute conversion reached a level of about 95% relative to a gas hourly space velocity of 4000 1/h, whereby at a gas hourly space velocity of 8000 1/h the conversion was still above 80%. As can be seen in FIG. 4 for Comparative Example 2, the conversion reached a level of less than 70% relative to a gas hourly space velocity of 4000 1/h, whereby at a gas hourly space velocity of 8000 1/h the conversion dropped at about 45% and stayed below a level of 50% for both the conversion of methane as well as of carbon dioxide.

TABLE 6

Test protocol used for catalytic testing. In each phase the pressure was adjusted to 20 bar (gauge)

| Phase [#] | Time on stream [h] | T [° C.] | GHSV [h⁻¹] | Methane-in [Vol.-%] | CO₂-in [Vol.-%] | Steam-in [Vol.-%] | Argon-in [Vol.-%] | Nitrogen-in [Vol.-%] |
|---|---|---|---|---|---|---|---|---|
| 1.a) | 14 | 25-900 | 8000 | 0.0 | 0.0 | 0.0 | 5.0 | 95.0 |
| 1.b) | 0.3 | 900 | 8000 | 0.0 | 0.0 | 15.0 | 5.0 | 80.0 |
| 2 | 6 | 900 | 8000 | 40.0 | 40.0 | 15.0 | 5.0 | 0.0 |
| 3 | 30 | 950 | 4000 | 40.0 | 40.0 | 15.0 | 5.0 | 0.0 |
| 4 | 24 | 950 | 4000 | 37.5 | 37.5 | 20.0 | 5.0 | 0.0 |
| 5 | 12 | 950 | 8000 | 37.5 | 37.5 | 20.0 | 5.0 | 0.0 |
| 6 | 12 | 950 | 8000 | 40.0 | 40.0 | 15.0 | 5.0 | 0.0 |
| 7 | 12 | 950 | 4000 | 37.5 | 37.5 | 20.0 | 5.0 | 0.0 |
| 8 | 12 | 950 | 4000 | 40.0 | 40.0 | 15.0 | 5.0 | 0.0 |
| Shut-down | 20 | 950-25 | 8000 | 0.0 | 0.0 | 0.0 | 5.0 | 95.0 |

GHSV: gas hourly space velocity

Phases 1.a) and 1.b) were the start-up phase. Phase 3 was an activation phase in which the conversion increased with a certain rate as a function of time on stream. In phases 4 to 8 the performance of the catalyst fully evolved, and conversion values either decreased due to progressing deactivation of the catalyst or remained constant with increasing reaction time. Based on the quantification of the product gas stream the methane conversion [1], carbon dioxide conversion [2], hydrogen/carbon monoxide ratio as well as the product gas composition and $C_2$-components fraction were calculated:

$$\text{Methane conversion: } X(CH_4)=1\text{-}(CH_4\text{-out}/CH_4\text{-in}) \qquad [1]$$

$$\text{Carbon dioxide conversion: } X(CO_2)=1\text{-}(CO_2\text{-out}/CO_2\text{-in}) \qquad [2]$$

As regards the absolute conversion shown in FIGS. 2 and 4, the catalyst in accordance with the Inventive Example 1 reached conversion levels of above 80% with respect to carbon dioxide and methane for the first time after a time on stream (TOS) between 15 and 20 h, whereas the catalyst in accordance with Comparative Example 2 reached conversion levels of above 60% with respect to carbon dioxide and methane for the first time after a time on stream (TOS) between 25 and 30 h, not to mention that the maximum level of conversion stayed for Comparative Example 2 below 70% for the whole time on stream. Said results clearly indicate a superior activity of the catalyst in accordance with Inventive Example 1 compared to the catalyst in accordance with Comparative Example 2.

Further, it is shown in FIGS. 3 and 5 that the relative conversion as regards methane and carbon dioxide for a gas hourly space velocity of 4000 1/h for Inventive Example 1 reached a maximum level of about 95% for the first time at around 20 h time on stream, but for Comparative Example 2 the relative conversion reached a maximum level of about 80% for the first time at around 55 to 60 h time on stream. Further, the relative conversion stayed in the range of 80 to 90% for Inventive Example 1 when the gas hourly space velocity was 8000 1/h, whereas the relative conversion stayed in the range of 50 to 60% for Comparative Example 2 when the gas hourly space velocity was 8000 1/h. Said results clearly indicate that the catalyst in accordance with the present invention shows superior catalytic activity with regard to the conversion of methane and carbon dioxide in comparison to the catalyst in accordance with Comparative Example 2.

Thus, it can be clearly seen that the catalyst in accordance with Inventive Example 1 shows superior catalytic properties in comparison to the catalyst in accordance with Comparative Example 2 representing the prior art.

CITED LITERATURE

Figure 1:
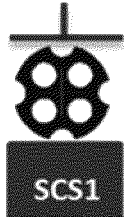
FIG. 1: shows on the left the side view for the arrangement for determining side crushing strength 1 (SCS1), in the middle the side view for the arrangement for determining side crushing strength 2 (SCS2), and on the right the side view for the arrangement for determining side crushing strength 3 (SCS3).
Figure 1:
Figure 1:
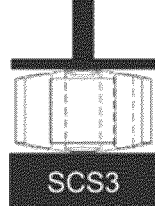
Figure 2:
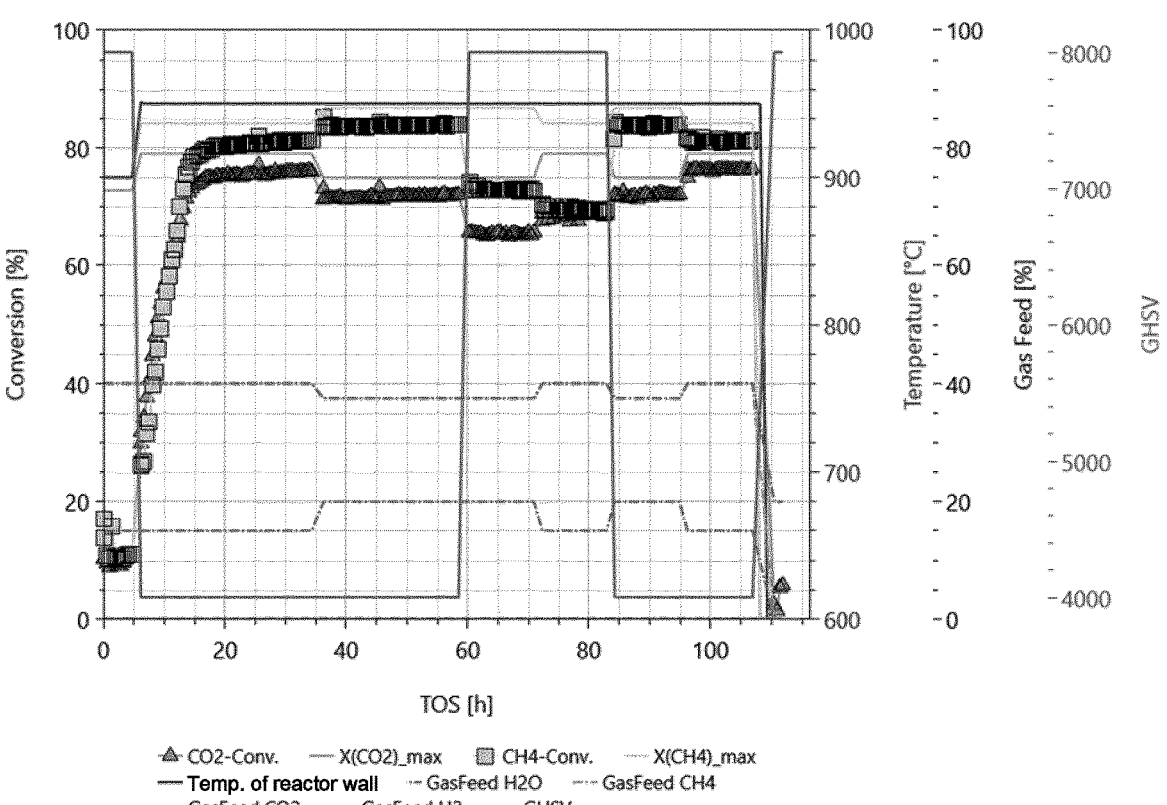
FIG. 2: shows on the ordinate (left) the conversion of carbon dioxide and methane in % for a process for producing a synthesis gas using the split (powder fraction of 0.5 to 1.0 mm) of the molding according to inventive example 1. The temperature (in ° C.), the composition of the reactant gas stream (in volume-%), and the gas hourly space velocity (GHSV; in 1/h) are also shown on the ordinate (right). The time on stream (TOS) is shown on the abscissa.
Figure 3:
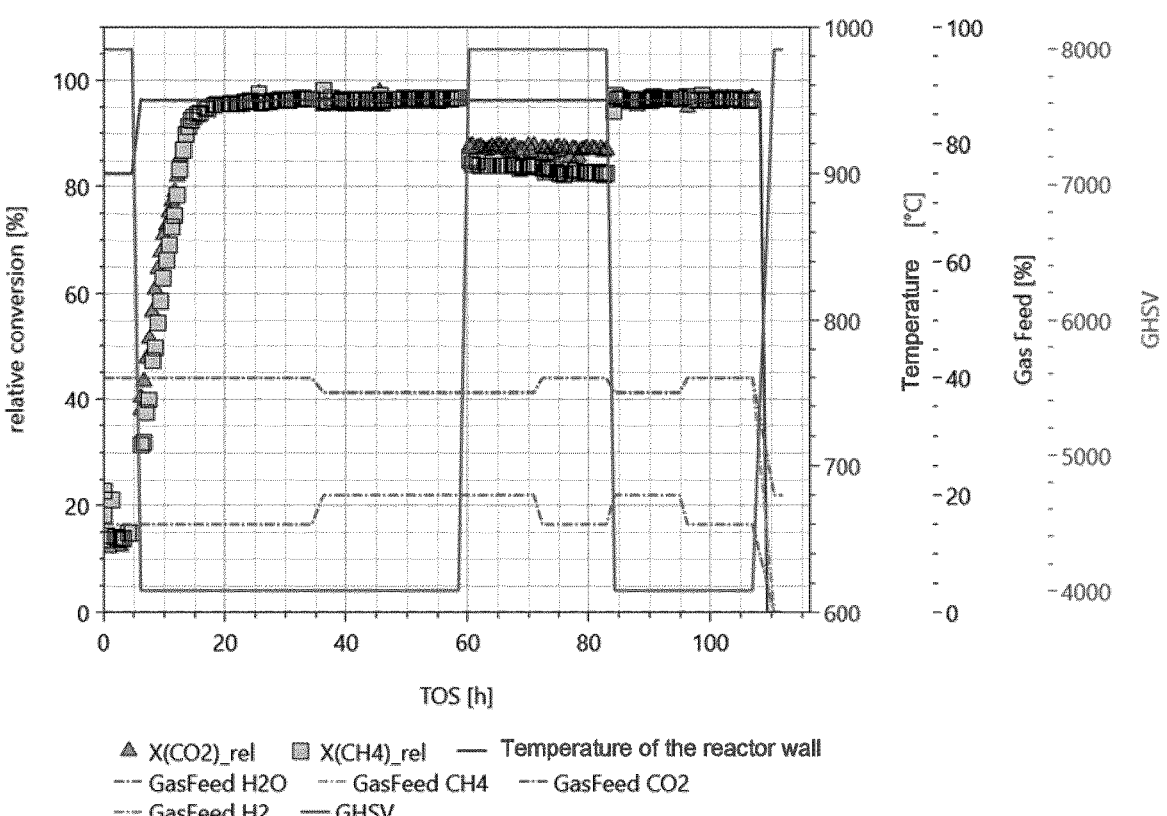
FIG. 3: shows on the ordinate (left) the relative conversion of carbon dioxide and methane in % for a process for producing a synthesis gas using the split (powder fraction of 0.5 to 1.0 mm) of the molding according to inventive example 1. The temperature (in ° C.), the composition of the reactant gas stream (in volume-%), and the gas hourly space velocity (GHSV; in 1/h) are also shown on the ordinate (right). The time on stream (TOS) is shown on the abscissa.
Figure 4:
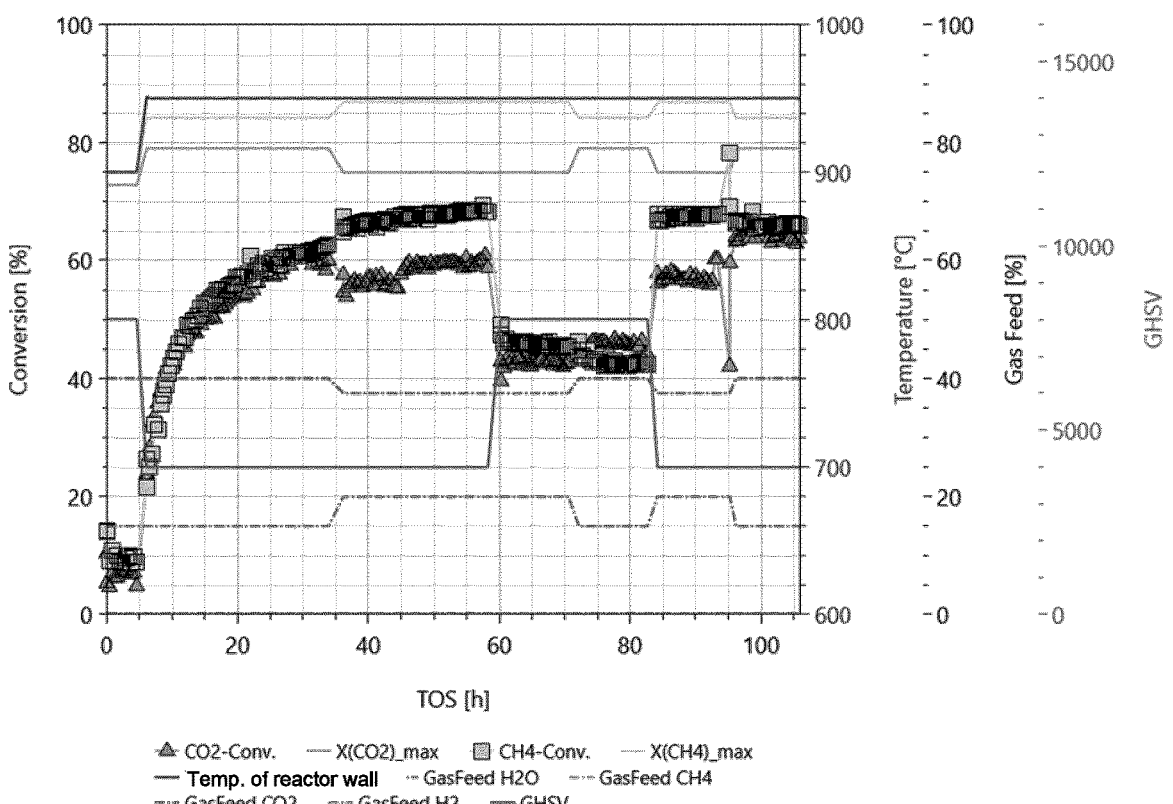
FIG. 4: shows on the ordinate (left) the conversion of carbon dioxide and methane in % for a process for producing a synthesis gas using the split (powder fraction of 0.5 to 1.0 mm) of the molding according to Comparative Example 2. The temperature (in ° C.), the composition of the reactant gas stream (in volume-%), and the gas hourly space velocity (GHSV; in 1/h) are also shown on the ordinate (right). The time on stream (TOS) is shown on the abscissa.
Figure 5:
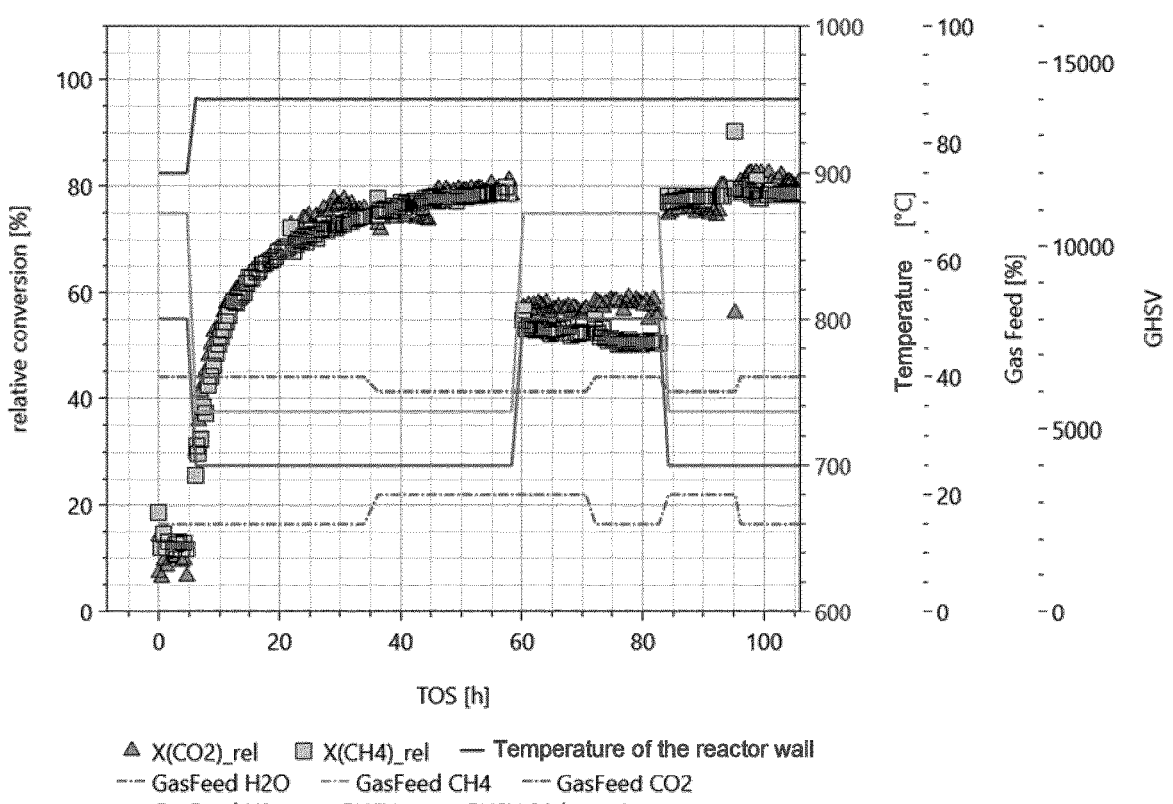
FIG. 5: shows on the ordinate (left) the relative conversion of carbon dioxide and methane in % for a process for producing a synthesis gas using the split (powder fraction of 0.5 to 1.0 mm) of the molding according to Comparative Example 2. The temperature (in ° C.), the composition of the reactant gas stream (in volume-%), and the gas hourly space velocity (GHSV; in 1/h) are also shown on the ordinate (right). The time on stream (TOS) is shown on the abscissa.

WO 2013/118078 A1
U.S. Pat. No. 9,259,712 B2

The invention claimed is:

1. A molding, comprising a mixed oxide, wherein the mixed oxide comprises oxygen, lanthanum, aluminum, and cobalt, wherein in the mixed oxide, the weight ratio of cobalt relative to aluminum, calculated as elements, is at least 0.17:1, and wherein from 17.5 to 20 weight % of the mixed oxide consists of lanthanum, calculated as element,
   wherein the mixed oxide comprises a crystalline phase of $LaCoAl_{11}O_{19}$ and a crystalline phase of $LaAlCoO_3$, wherein in the mixed oxide, the weight ratio of $LaCoAl_{11}O_{19}$ relative to $LaAlCoO_3$ is in the range of from 5:1 to 30:1.

2. The molding of claim 1, wherein in the mixed oxide, the weight ratio of cobalt relative to aluminum, calculated as elements, is in the range of from 0.17:1 to 0.24:1.

3. The molding of claim 1, wherein in the mixed oxide, the weight ratio of cobalt relative to lanthanum, calculated as elements, is in the range of from 0.35:1 to 0.48:1.

4. The molding of claim 1, wherein from 99 to 100 weight % of the mixed oxide consist of oxygen, lanthanum, aluminum, cobalt, and optionally hydrogen.

5. The molding of claim 1, wherein from 99 to 100 weight % of the molding consist of the mixed oxide.

6. The molding of claim 1, having a BET specific surface area in the range of from 1 to 10 m²/g.

7. A process for preparing the molding comprising a mixed oxide of claim 1, the process comprising
   (i) preparing a mixture comprising a lanthanum salt, a cobalt salt, an oxidic aluminum compound, and an acid, wherein one or more of the lanthanum salt and the cobalt salt are not a nitrate;
   (ii) preparing a molding from the mixture obtained from (i), comprising
      (ii.1) subjecting the mixture obtained from (i) to a shaping process, obtaining a first molding;
      (ii.2) preferably drying the first molding obtained from (ii.1) in a gas atmosphere;
      (ii.3) calcining the first molding obtained from (ii.1) or (ii.2), preferably from (ii.2), in a gas atmosphere having a temperature in the range of from 350 to 470° C.;
   (iv) calcining the molding obtained from (ii) or (iii), preferably from (iii), in a gas atmosphere having a temperature in the range of from 1100 to 1400° C., obtaining the molding comprising the mixed oxide.

8. The process of claim 7, wherein the process further comprises a third step (iii), prior to step (iv), the third step comprising subjecting the calcined first molding obtained from (ii) to a re-shaping process, obtaining a second molding having a geometry different from the geometry of the first molding.

9. The process of claim 7, wherein the acid according to (i) is one or more of formic acid, acetic acid, propionic acid, nitric acid, nitrous acid, citric acid, tartaric acid, and oxalic acid.

10. The process of claim 7, wherein in the mixture prepared in (i), the molar ratio of the acid relative to cobalt is in the range of from 1:2 to 9:1.

11. The process of claim 7, consisting of (i), (ii), (iii) and (iv).

* * * * *